(12) United States Patent
Yamatsu et al.

(10) Patent No.: US 8,223,610 B2
(45) Date of Patent: Jul. 17, 2012

(54) APPARATUS AND METHOD FOR INITIALIZING INFORMATION RECORDING MEDIUM, APPARATUS AND METHOD FOR RECORDING INFORMATION, AND INFORMATION RECORDING MEDIUM

(75) Inventors: Hisayuki Yamatsu, Tokyo (JP); Kimihiro Saito, Saitama (JP); Seiji Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/595,012

(22) PCT Filed: Feb. 5, 2009

(86) PCT No.: PCT/JP2009/052345
§ 371 (c)(1),
(2), (4) Date: Jan. 8, 2010

(87) PCT Pub. No.: WO2009/099245
PCT Pub. Date: Aug. 13, 2009

(65) Prior Publication Data
US 2010/0296374 A1    Nov. 25, 2010

(30) Foreign Application Priority Data
Feb. 7, 2008   (JP) .................................. 2008-028061

(51) Int. Cl.
*G11B 7/0065* (2006.01)
(52) U.S. Cl. ...................................................... 369/103
(58) Field of Classification Search .................. None
See application file for complete search history.

(56) References Cited

U.S. PATENT DOCUMENTS

| | | | | |
|---|---|---|---|---|
| 4,306,763 A | * | 12/1981 | Huignard ........................ 359/19 |
| 5,608,717 A | * | 3/1997 | Ito et al. ..................... 369/275.3 |
| 6,212,148 B1 | | 4/2001 | Hesselink et al. |
| 6,373,806 B1 | * | 4/2002 | Kitamura et al. ............. 369/103 |
| 6,614,741 B1 | | 9/2003 | Hesselink et al. |
| 6,750,100 B2 | * | 6/2004 | Hsu et al. ...................... 438/257 |

(Continued)

FOREIGN PATENT DOCUMENTS

EP    2 063 426    5/2009

(Continued)

OTHER PUBLICATIONS

Kasami, Y. et al., "Large Capacity and High-Data-Rate Phase-Change Disks", Jpn. J. Appl. Phys. vol. 39, Part 1, No. 2B, pp. 756-761, (Feb. 2000).

(Continued)

*Primary Examiner* — Peter Vincent Agustin
(74) *Attorney, Agent, or Firm* — Oblon, Spivak, McClelland, Maier & Neustadt, L.L.P.

(57) ABSTRACT

An initialization apparatus that has a simplified configuration and that forms an initial hologram in an information recording medium is provided. An initialization apparatus (10) rotates an optical disk (100) and emits blue light beams (Lb1) and (Lb2) to either side of the optical disk (100) while causing a red light beam (Lr1) to follow a track formed in a reference layer (102). Thus, the initialization apparatus (10) can perform an initialization process in which a linear initial hologram IH is formed in a recording layer (101) in a spiral pattern that corresponds to the track formed in a reference layer (102). Accordingly, the initialization apparatus (10) can form a planar initial hologram layer (YH) with significantly reduced optical energy or thermal energy emitted to the optical disk (100) at one time.

11 Claims, 10 Drawing Sheets

U.S. PATENT DOCUMENTS

| | | | |
|---|---|---|---|
| 7,492,692 B2 * | 2/2009 | Tateishi et al. | 369/103 |
| 7,507,504 B2 * | 3/2009 | Wu et al. | 430/1 |
| 7,830,771 B2 * | 11/2010 | Tatsuta et al. | 369/103 |
| 2002/0051419 A1 * | 5/2002 | Itoh et al. | 369/103 |
| 2002/0080434 A1 * | 6/2002 | Tanaka | 359/35 |
| 2003/0156523 A1 * | 8/2003 | Wu et al. | 369/103 |
| 2004/0212859 A1 * | 10/2004 | Tsukagoshi | 359/15 |
| 2005/0135217 A1 * | 6/2005 | Tateishi et al. | 369/103 |
| 2006/0227398 A1 | 10/2006 | Lawrence et al. | |
| 2008/0247011 A1 | 10/2008 | Lawrence et al. | |
| 2008/0279061 A1 * | 11/2008 | Ogasawara et al. | 369/44.37 |
| 2009/0003177 A1 | 1/2009 | Tanabe | |
| 2009/0147333 A1 * | 6/2009 | Yamatsu et al. | 359/22 |
| 2010/0046338 A1 | 2/2010 | Saito et al. | |

FOREIGN PATENT DOCUMENTS

| | | |
|---|---|---|
| JP | 2002 502057 | 1/2002 |
| JP | 2009 8715 | 1/2009 |
| WO | 01 09884 | 2/2001 |

OTHER PUBLICATIONS

Ichimura, I. et al., "Proposal for a Multilayer Read-Only-Memory Optical Disk Structure", Applied Optics, vol. 45, No. 8, pp. 1794-1803, (Mar. 10, 2006).

McLeod, R. R. et al., "Microholographic Multilayer Optical Disk Data Storage", Applied Optics, vol. 44, No. 16, pp. 3197-3207 (Jun. 1, 2005).

* cited by examiner (A)

(B)

(C)

(D)

APPARATUS AND METHOD FOR INITIALIZING INFORMATION RECORDING MEDIUM, APPARATUS AND METHOD FOR RECORDING INFORMATION, AND INFORMATION RECORDING MEDIUM

TECHNICAL FIELD

The present invention relates to an apparatus and a method for initializing an information recording medium, an apparatus and a method for recording information, and an information recording medium. In particular, the present invention relates to an initialization apparatus for initializing, for example, an optical disk using a hologram and an optical disk apparatus for reconstructing information from the optical disk.

BACKGROUND ART

Optical disk apparatuses that emit a light beam to an optical disk (e.g., a compact disc (CD), a digital versatile disc (DVD), or a Blu-ray disc (trade name, hereinafter referred to as a "BD")) and read the light reflected by the optical disk so as to reconstruct information have been widely used.

Such existing optical disk apparatuses emit a light beam to the optical disk and locally change the reflectance of the optical disk. In this way, the optical disk apparatuses record information.

For such an optical disk, the size of a light beam spot formed on the optical disk is expressed as about $\lambda/NA$ ($\lambda$: the wavelength of the light beam, NA: numerical aperture). It is known that the resolution is proportional to this value. For example, Non-Patent document 1 describes the details of a BD that can record 25-GB data on an optical disk and that has a diameter of 120 [nm].

In addition, optical disks are configured so that various content, such as music content and video content, or various types of computer data can be record thereon. In particular, in recent years, an amount of information of content has been increased in order to provide high-resolution video or high-quality music. Furthermore, the number of content items recorded in an optical disk needs to be increased. Accordingly, an increase in the capacity of an optical disk is required.

Accordingly, a method for increasing the capacity of an optical disk by stacking a plurality of recording layers in the optical disk has been proposed (refer to, for example, Non-Patent document 2).

In addition, as means for recording information on an optical disk, an optical disk apparatus using a hologram has been proposed (refer to, for example, Non-Patent document 3). Two types of such optical disk apparatuses are proposed: one is a method for recording information by locally generating holograms in an optical disk (called a positive-type method) and the other is a method for generating a hologram in advance by initializing an optical disk (hereinafter referred to as an "initial hologram") and locally erasing the generated hologram (called a negative-type method).

For positive-type optical disk apparatuses, since a hologram needs to be generated in an optical disk when a user records information on the optical disk, a so-called two-side optical system that emits light beams onto either side of the optical disk is required. Accordingly, the structure is relatively complicated.

In contrast, for negative-type optical disk apparatuses, by simply erasing an initial hologram using high thermal energy and optical energy, a user can record information on the optical disk. Accordingly, a so-called one-side optical system that emits a light beam onto only one side of the optical disk can be used. As a result, the structure of the negative-type optical disk apparatuses can be simplified, as compared with that of the positive-type optical disk apparatuses.

Non-Patent Document 1: Y. Kasami, Y. Kuroda, K. Seo, O. Kawakubo, S. Takagawa, M. Ono, and M. Yamada, Jpn. J. Appl. Phys., 39, 756 (2000)

Non-Patent Document 2: I. Ichimura et al, Technical Digest of ISOM '04, pp 52, Oct. 11-15, 2005, Jeju Korea Non-Patent Document 3: R. R. McLeod et al., "Microholographic multilayer optical disk data storage," Appl. Opt., Vol. 44, 2005, pp 3197

Incidentally, as described above, for negative-type optical disk apparatuses, an initial hologram needs to be generated in an optical disk through initial processing in advance. In such initial processing, for example, by propagating plane waves so that the plane waves face each other, a volume type initial hologram can be formed. In this case, the initial processing takes, for example, about 5 [ms] until completion.

However, in order to emit plane waves onto an optical disk having a diameter of, for example, about 120 [mm], a laser light source having a high light intensity is required, for example. Consequently, the structure of an initializing apparatus for initializing an optical disk is large-scaled and complicated.

In addition, optical disks are required to maintain the formation states of a hologram and an initial hologram for day-to-day use. Accordingly, it is desirable that the material that forms a recording layer of an optical disk have a threshold value of sensitivity that does not respond to a relatively low light intensity and responds to a relatively high light intensity.

However, if optical disks have such a threshold value, the light intensity required for initializing the optical disks is increased. Accordingly, the initialization apparatuses require, for example, a laser beam source having a significantly high light intensity in order to initialize such optical disks. Thus, in practice, it is very difficult to produce such initialization apparatuses.

DISCLOSURE OF INVENTION

Accordingly, the present invention provides an information recording medium initialization apparatus and an information recording medium initialization method that have a simplified configuration and that are capable of forming a hologram in an information recording medium, an information recording apparatus and an information recording method capable of appropriately recording information in an information recording medium having a hologram formed therein, and an information recording medium capable of recording information therein using a hologram.

To solve such a problem, according to the present invention, when initializing an information recording medium that records information therein through erasing of a preformed initial hologram, an information recording medium initialization apparatus and an information recording medium initialization method focus two spherical wave recording beams propagating in opposite directions at the same focal point in the information recording medium so as to form the initial hologram in the vicinity of the focal point. Thereafter, the information recording medium initialization apparatus and the information recording medium initialization method sequentially move the focal point to a portion of the information recording medium in which the information is to be recorded.

According to the information recording medium initialization apparatus and the information recording medium initialization method, even when the light intensity of the spherical wave recording beams is relatively low, the initial hologram can be formed by condensing the spherical wave recording beams. In addition, the initial hologram can be sufficiently formed at a position at which information is to be recorded later.

In addition, according to the information recording medium initialization apparatus and the information recording medium initialization method of the present invention, when information is recorded by erasing the initial hologram preformed in the information recording medium, the focal point of a light beam that is focused in the information recording medium through an objective lens is moved while following the initial hologram. By emitting the light beam through the objective lens, the initial hologram in the vicinity of the focal point is erased.

According to the information recording medium initialization apparatus and the information recording medium initialization method, the initial hologram that is provided for recording information can be used for determining the position at which the information is to be recorded.

Furthermore, in the information recording medium according to the present invention, a recording layer is provided. The recording layer includes an initial hologram continuously or intermittently formed in a space having a substantially uniform index of refraction along a virtual trajectory and records information therein when a predetermined information recording apparatus emits a recording light beam to the initial hologram and locally erases the initial hologram.

In the information recording medium, since the initial hologram is appropriately formed at a position at which information is to be recorded, the information can be appropriately recorded by the information recording apparatus.

According to the present invention, even when the light intensity of spherical wave recording light beam is relatively low, the light intensity can be increased by condensing the recording light beam and, therefore, an initial hologram can be formed. In addition, the initial hologram is sufficiently formed at a portion in which information is to be recorded later. Thus, an information recording medium initialization apparatus and an information recording medium initialization method that can form a hologram in an information recording medium with a simplified structure can be provided.

Furthermore, according to the present invention, the initial hologram that is provided for recording information can be used for determining the position at which the information is to be recorded. Consequently, an information recording apparatus and an information recording method that can appropriately record information in an information recording medium having a hologram preformed therein can be provided.

Still furthermore, according to the present invention, since the initial hologram is appropriately formed at a position at which information is to be recorded, the information can be appropriately recorded by the information recording apparatus. Consequently, an information recording medium that records information using a hologram can be provided.

BEST MODES FOR CARRYING OUT THE INVENTION

An embodiment of the present invention is described below with reference to the accompanying drawings.

(1) First Embodiment (1-1) Structure of Optical Disk

Figure 1:
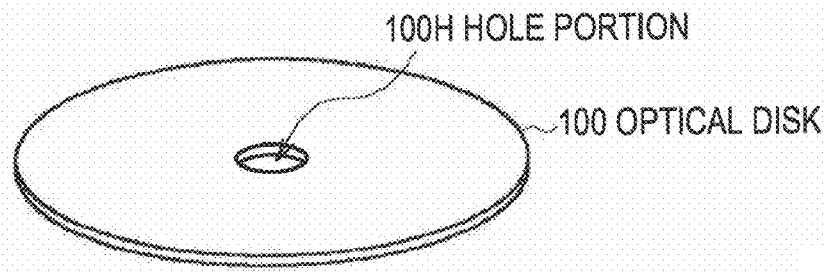
FIG. 1 is a schematic perspective view of an external structure of an optical disk.

An optical disk 100 used as an information recording medium according to the present embodiment is first described. As shown by an external view in FIG. 1, the optical disk 100 is configured so that, like existing CDs, DVDs, and BDs, the entire body of the optical disk 100 has a disk-shape having a diameter of about 120 [nm] and a hole portion 100H is formed at the center thereof.

Figure 2:
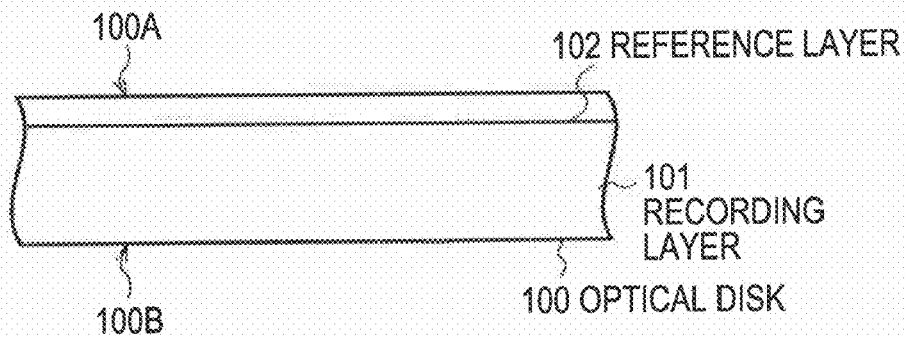
FIG. 2 is a schematic cross-sectional view of an internal structure of an optical disk.

In addition, as shown by the cross-sectional view in FIG. 2, the optical disk 100 includes a recording layer 101 that records information in the middle. The optical disk 100 further includes a reference layer 102 on a side of a first surface 100A thereof.

Figure 3:
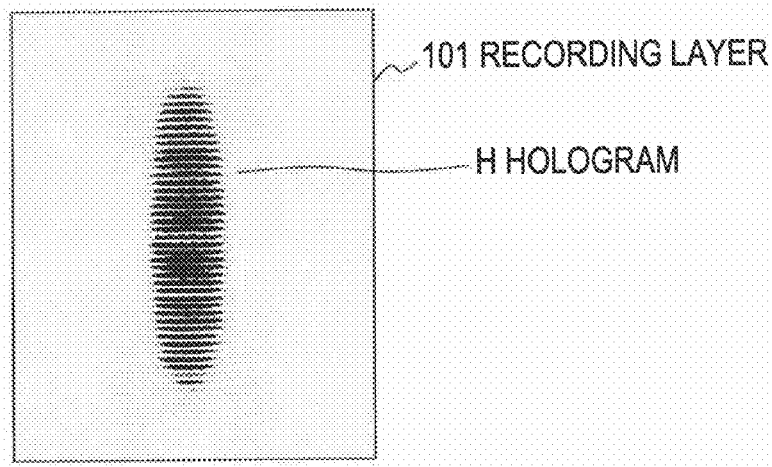
FIG. 3 is a schematic illustration of formation of a hologram.

The recording layer 101 is formed of photopolymers having an index of refraction that varies in accordance with the intensity of a light beam emitted thereto. The recording layer 101 is sensitive to a blue laser beam having a wavelength of about 405 [nm]. In practice, as shown in FIG. 3, the recording layer 101 records, in the form of a hologram, interference fringes generated when two blue laser beams are emitted from the sides of the first surface 100A and a second surface 100B opposite the first surface 100A (described in more detail below).

The reference layer 102 is formed from, for example, a dielectric multilayer. The reference layer 102 has wavelength selectivity (a dichroic characteristic) that allows almost all of a blue light beam having a wavelength of 405 [nm] to pass therethrough and that reflects almost all of a red light beam having a wavelength of 650 [nm].

In addition, the reference layer 102 has a guide groove formed therein. The guide groove is used for a tracking servo operation and a focus servo operation. More specifically, the reference layer 102 has a spiral track formed from a land and a groove similar to those of a widely used BD-R (Recordable) disk. The track has address information and track information assigned thereto. Each of the address information and track information includes a series of numbers, each assigned to one of predetermined units of recording. Thus, a track on and from which information is recorded and reproduced can be identified by using the address information or the track information.

The reference layer 102 is designed so as to indicate a reference position used when a position to be irradiated with a light beam is determined (i.e., when positioning is performed).

Note that the reference layer 102 may include pits formed therein in place of a groove. Alternatively, the reference layer 102 may include a combination of a groove and pits. That is, it is only required that the address information be recognized using a light beam.

The optical disk 100 is physically produced in, for example, a manufacturing facility. Thereafter, an initialization process (described below) is performed on the optical disk 100 and is shipped. Users can record information on the optical disk 100 and reproduce the information from the optical disk 100.

(1-2) Initialization of Optical Disk (1-2-1) Architecture of Initialization Apparatus An initialization apparatus 10 that initializes the optical disk 100 is described next. The initialization apparatus 10 is designed to perform an initialization process on the optical disk 100 primarily in a manufacturing facility that produces the optical disk 100.

Figure 4:
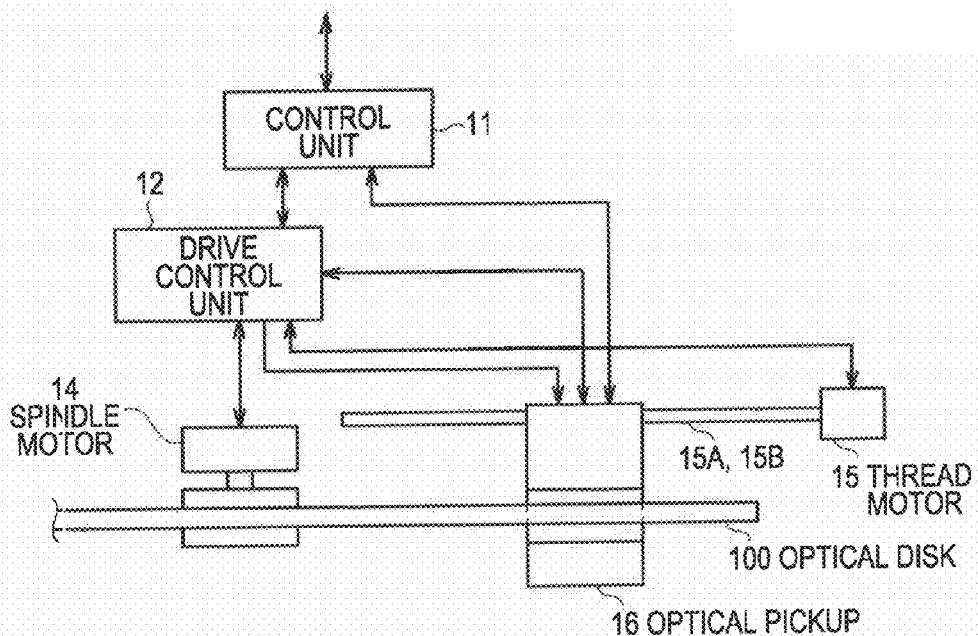
FIG. 4 is a schematic illustration of the structure of an initialization apparatus.

As shown in FIG. 4, in the initialization apparatus 10, a control unit 11 performs overall control. The control unit 11 is primarily formed from a central processing unit (CPU) (not shown). The control unit 11 reads a variety of programs, such as a basic program and an initialization program, from a read only memory (ROM) (not shown) and loads the programs into a random access memory (RAM) (not shown). In this way, the control unit 11 performs various processing, such as initialization processing.

For example, when the control unit 11 receives an initialization command via, for example, an operation unit (not shown) with the optical disk 100 shown in FIG. 3 mounted therein, the control unit 11 supplies a drive command to a drive control unit 12 under the control of the initialization program.

The drive control unit 12 is designed so as to perform computation on a supplied signal and generate a supply signal to be supplied to an actuator (described below). In addition, the drive control unit 12 is designed so as to perform a variety of drive control processes.

In response to the drive command, the drive control unit 12 controls driving of a spindle motor 14 so as to rotate the optical disk 100, for example, at a constant linear velocity. In addition, in response to the drive command, the drive control unit 12 controls driving of a thread motor 15 so as to move an optical pickup 16 in the radial direction of the optical disk 100 (i.e., the inner peripheral direction or the outer peripheral direction) along movement shafts 15A and 15B.

Figure 5:
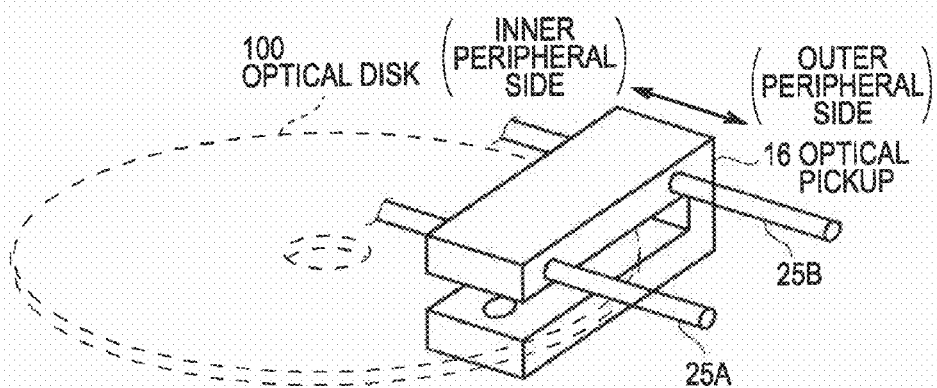
FIG. 5 is a block diagram schematically illustrating an external structure of an optical pickup of the initialization apparatus.

As shown in FIG. 5, the optical pickup 16 has a substantially U shape when viewed from the side. Thus, two light beams can be condensed and emitted onto either side of the optical disk 100. In addition, the optical pickup 16 detects a light beam transmitted through the optical disk 100 or reflected by the optical disk 100 and supplies the detection result to the drive control unit 12.

Furthermore, under the control of the drive control unit 12, the optical pickup 16 performs position control, such as focus control and tracking control so as to focus the light beam at a desired position (described in more detail below).

As used herein, the term "focus direction" refers to a direction towards or away from the optical disk 100. The term "tracking direction" refers to the radial direction of the optical disk 100 (i.e., a direction towards the inner periphery or a direction towards the outer periphery).

As described above, the initialization apparatus 10 rotates the optical disk 100 using the spindle motor 14 and moves the optical pickup 16 in the radial direction using the thread motor 15. In this way, the initialization apparatus 10 can focus the light beam on the optical disk 100 at various points.

(1-2-2) Configuration of Optical Pickup of Initialization Apparatus

Figure 6:
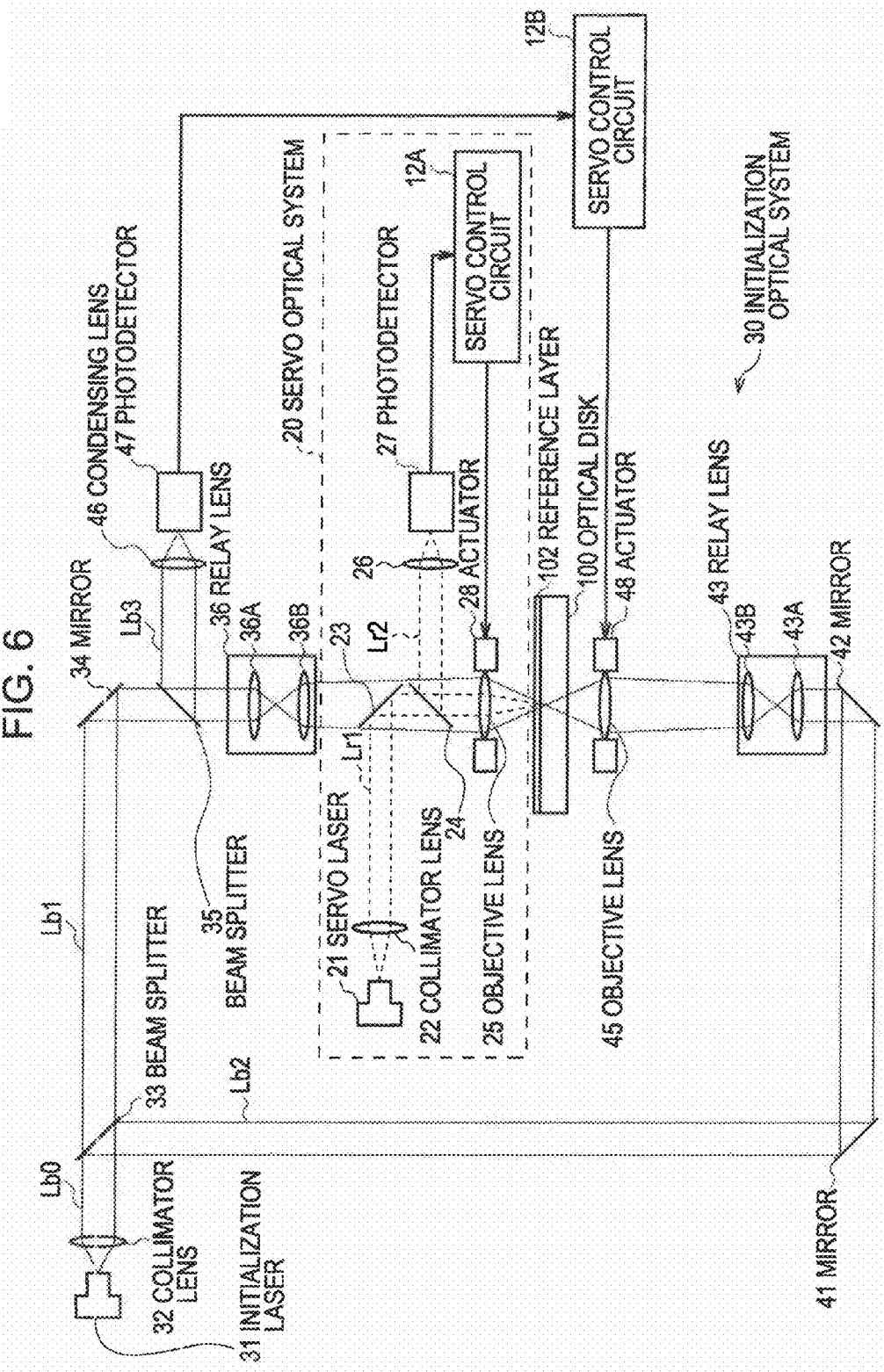
FIG. 6 is a schematic illustration of an internal structure of an optical pickup of the initialization apparatus.

The configuration of the optical pickup 16 is described next. As schematically illustrated in FIG. 6, the optical pickup 16 includes a plurality of optical components. The optical pickup 16 primarily includes a servo optical system 20 and an initialization optical system 30.

(1-2-2-1) Configuration of Servo Optical System

The servo optical system 20 emits a red light beam Lr1 onto the first surface 100A of the optical disk 100. The servo optical system 20 then receives a reflected red light beam Lr2, which is the red light beam Lr1 reflected by the optical disk 100.

For example, a servo laser 21 of the servo optical system 20 is a semiconductor laser. The servo laser 21 can emit a red laser beam having a wavelength of about 650 [nm]. In practice, under the control of the control unit 11 (see FIG. 4), the servo laser 21 emits the diverging red light beam Lr1 having a predetermined intensity into a collimator lens 22.

The collimator lens 22 converts the red light beam Lr1 from a diverging light beam to a parallel light beam and allows the red light beam Lr1 to be incident on a beam splitter 23.

The beam splitter 23 has wavelength selectivity (a dichroic characteristic) in which the index of refraction is changed in accordance with the wavelength of the light beam. The beam splitter 23 reflects about 100% of a light beam having a wavelength of about 650 [nm]. In addition, the beam splitter 23 allows about 100% of a light beam having a wavelength of about 405 [nm] to pass therethrough.

In practice, the beam splitter 23 reflects about 100% of the red light beam Lr1 having a wavelength of 650 [nm] and directs the red light beam Lr1 to the next beam splitter 24.

The beam splitter 24 allows about 50% of a light beam to pass therethrough and reflects the remaining light beam. In practice, the beam splitter 24 allows about 50% of the red light beam Lr1 to pass therethrough and directs the red light beam Lr1 to an objective lens 25.

The objective lens 25 condenses the red light beam Lr1 and emits the red light beam Lr1 to the first surface 100A of the optical disk 100. At that time, the red light beam Lr1 is reflected by the reference layer 102 of the optical disk 100. The reflected red light beam Lr1 serves as the reflected red light beam Lr2 traveling in a direction opposite to the direction in which the red light beam Lr1 travels.

Since the red light beam Lr1 is a converging light beam, the reflected red light beam Lr2 is a diverging light beam. The reflected red light beam Lr2 is converted into a parallel light beam by the objective lens 25 and is directed to the beam splitter 24. At that time, about 50% of the reflected red light beam Lr2 is reflected by the beam splitter 24 and is directed to a condensing lens 26.

The condensing lens 26 condenses the reflected red light beam Lr2. The reflected red light beam Lr2 is made astigmatic by passing it through, for example, a cylindrical lens (not shown). Thereafter, the reflected red light beam Lr2 is made incident on a photodetector 27.

Figure 7:
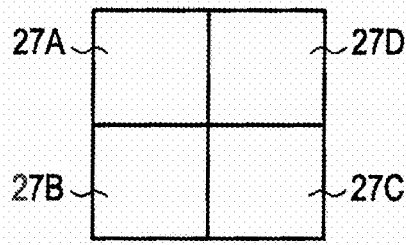
FIG. 7 is a schematic illustration of the structure of a photodetector.
Figure 7:
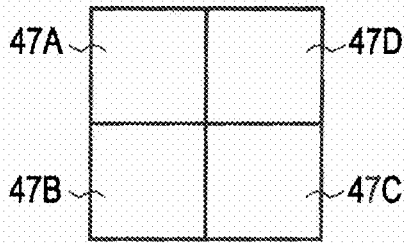
Figure 7:
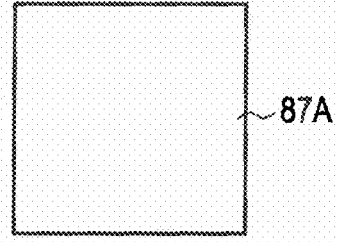
Figure 7:
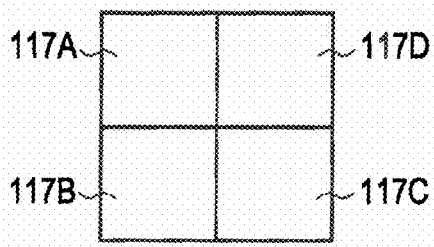

As shown in FIG. 7(A), the photodetector 27 includes four separate lattice-shaped detection areas 27A, 27B, 27C, and 27D in the surface thereof onto which the reflected red light beam Lr2 is emitted. Note that the direction indicated by an arrow a1 (the vertical direction in FIG. 7(A)) corresponds to a direction in which a track formed in the reference layer 102 moves when the red light beam Lr1 is emitted onto the reference layer 102 (see FIG. 3).

The photodetector 27 detects portions of the reflected red light beam Lr2 using the detection areas 27A, 27B, 27C, and 27D. Thereafter, the photodetector 27 generates detection signals U1A, U1B, U1C, and U1D (hereinafter collectively referred to as "detection signals U1A to U1D") and outputs the detection signals to the drive control unit 12 (see FIG. 4).

Note that, in the servo optical system 20, the red light beam Lr1 is condensed by the objective lens 25, and the optical positions of the optical components are adjusted so that the focus state of the red light beam Lr2 when the red light beam Lr2 is condensed by the condensing lens 26 and is emitted to the photodetector 27 is determined by the focus state of the red light beam Lr1 when the red light beam Lr1 is condensed by the objective lens 25 and is emitted to the reference layer 102 of the optical disk 100.

In order to perform focus control on the objective lens 25 using an astigmatism method, a servo control circuit 12A of the drive control unit 12 computes a focus error signal SFE1 using the detection signals U1A to U1D and the following equation (1):

$$SFE1=(U1A+U1C)-(U1B+U1D) \quad (1)$$

The focus error signal SFE1 represents an amount of shift of a focal point Fr of the red light beam Lr1 from the reference layer 102 of the optical disk 100 in a focus direction.

Subsequently, the servo control circuit 12A generates a focus drive signal SFD1 by, for example, amplifying the focus error signal SFE1 and supplies the focus drive signal SFD1 to an actuator 28.

The actuator 28 is disposed between a lens holder (not shown) that supports the objective lens 25 and the optical pickup 16. The actuator 28 moves the objective lens 25 in the focus direction (a direction towards or away from the optical disk 100) in accordance with the focus drive signal SFD1.

In this way, the optical pickup 16 performs feedback control (i.e., focus control) on the objective lens 25 so that the value of the focus error signal SFE1 converges to a value "0", that is, the red light beam Lr1 is focused on the reference layer 102 of the optical disk 100.

In addition, in order to perform tracking control on the objective lens 25 using a push-pull method, a servo control circuit 12A computes a tracking error signal STE1 using the detection signals U1A to U1D and the following equation (2):

$$STE1=(U1A+U1B)-(U1C+U1D) \quad (2)$$

The tracking error signal STE1 represents an amount of shift of the focal point Fr of the red light beam Lr1 from a target track in the reference layer 102 of the optical disk 100 (hereinafter referred to as a "reference target track").

Subsequently, the servo control circuit 12A generates a tracking drive signal STD1 using the tracking error signal STE1 and supplies the tracking drive signal STD1 to the actuator 28. The actuator 28 moves the objective lens 25 in the tracking direction in accordance with the tracking drive signal STD1.

In this way, the initialization apparatus 10 performs feedback control (i.e., tracking control) on the objective lens 25 so that the red light beam Lr1 is focused on the reference target track in the reference layer 102 of the optical disk 100.

As described above, the servo optical system 20 of the optical pickup 16 emits the red light beam Lr1 onto the reference layer 102 of the optical disk 100. Thereafter, the servo optical system 20 performs focus control and tracking shift control on the objective lens 25 on the basis of the receiving result of the reflected red light beam Lr2, which is a reflected light beam of the red light beam Lr1, under the control of the drive control unit 12. Thus, the red light beam Lr1 follows the reference target track in the reference layer 102.

(1-2-2-2) Configuration of Initialization Optical System

The initialization optical system 30 condenses and emits blue light beams in the form of spherical waves in opposite directions, that is, onto either side of the optical disk 100 serving as an information recording medium. The focal points of the light beams are aligned at the same point in the recording layer 101.

For example, an initialization laser 31 of the initialization optical system 30 is a semiconductor laser. The initialization laser 31 can emit a blue laser beam having a wavelength of about 405 [nm]. In practice, under the control of the control unit 11 (see FIG. 4), the initialization laser 31 emits a blue light beam Lb0 having a constant intensity, which is a diverging light beam. The blue laser beam Lb0 is then made incident on a collimator lens 32.

The collimator lens 32 converts the blue laser beam Lb0 from a diverging light beam into a parallel light beam and causes the blue laser beam Lb0 to be incident on a beam splitter 33.

The beam splitter 33 allows about 50% of a light beam to pass therethrough and reflects the remaining about 50% of the light beam. In practice, the beam splitter 33 allows about 50% of the blue light beam Lb0 to pass therethrough so as to generate a blue light beam Lb1, and the beam splitter 33 reflects the remaining about 50% of the blue light beam Lb0 so as to generate a blue light beam Lb2.

The blue light beam Lb1 is reflected by a mirror 34 and is made incident on a beam splitter 35. The beam splitter 35 allows a predetermined percent of the blue light beam Lb1 to pass therethrough and causes the blue light beam Lb1 to be incident on a relay lens 36.

The relay lens 36 converts the blue light beam Lb1 from a parallel light beam into a converging light beam or a diverging light beam using a movable lens 36A. In addition, the relay lens 36 changes the converging state of the blue light beam Lb1 using a fixed lens 36B and causes the blue light beam Lb1 to be incident on the beam splitter 23.

At that time, the movable lens 36A can be moved by an actuator (not shown) in the direction of the optical axis of the blue light beam Lb1. In practice, under the control of the control unit 11 (see FIG. 4), the movable lens 36A of the relay lens 36 is moved by the actuator. Thus, the converging state (i.e., the converging angle or diverging angle) of the blue light beam Lb1 output from the fixed lens 36B can be changed.

The beam splitter 23 allows the blue light beam Lb1 to pass therethrough in accordance with the wavelength of the blue light beam Lb1 and causes the blue light beam Lb1 to be incident on the beam splitter 24. The beam splitter 24 allows a predetermined percent of the blue light beam Lb1 to pass therethrough and causes the blue light beam Lb1 to be incident on the objective lens 25.

The objective lens 25 converts the blue light beam Lb1 into spherical waves by condensing the blue light beam Lb1. Thereafter, the objective lens 25 emits the blue light beam Lb1 onto the first surface 100A of the optical disk 100. Note that, for the blue light beam Lb1, the objective lens 25 functions as a condensing lens having a numerical aperture (NA) of 0.5 in accordance with the optical distance from the relay lens 36.

Figure 8:
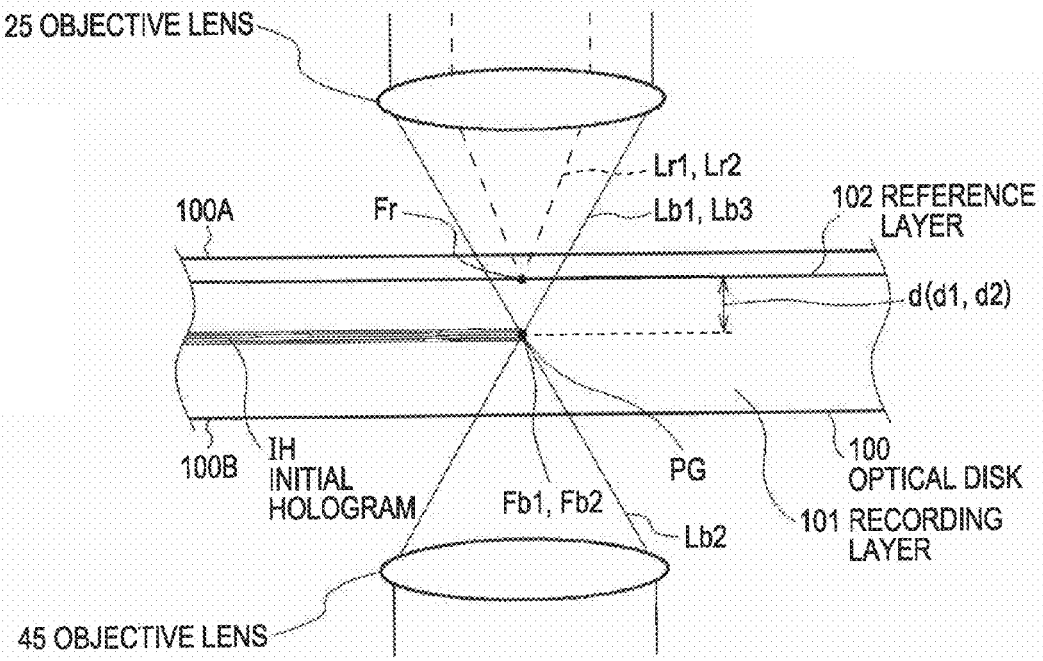
FIG. 8 is a schematic cross-sectional view illustrating formation of an initial hologram according to a first embodiment.

At that time, as shown in FIG. 8, the blue light beam Lb1 passes through the reference layer 102 and is focused inside the recording layer 101. Here, a focal point Fb1 of the blue light beam Lb1 is determined by the converging state occurring when the blue light beam Lb1 is output from the fixed lens 36B of the relay lens 36. That is, the focal point Fb1 of the blue light beam Lb1 is moved in the recording layer 101 towards the first surface 100A or the second surface 100B in accordance with the position of the movable lens 36A.

In practice, in the initialization optical system 30, by moving the position of the movable lens 36A by the control unit 11 (see FIG. 4), a depth d1 of the focal point Fb1 (see FIG. 8) (i.e., the distance between the focal point Fb1 and the reference layer 102) in the recording layer 101 of the optical disk 100 can be controlled.

In this way, in the initialization optical system 30, the blue light beam Lb1 is emitted through the first surface 100A of the optical disk 100 so that the focal point Fb1 is positioned inside the recording layer 101. In addition, the depth d1 of the focal point Fb1 can be controlled in accordance with the position of the movable lens 36A of the relay lens 36.

In contrast, after being reflected by the beam splitter 33, the blue light beam Lb2 is sequentially reflected by mirrors 41 and 42. Thereafter, the blue light beam Lb2 is made incident on a relay lens 43.

The relay lens 43 has a configuration similar to that of the relay lens 36. The relay lens 43 includes a movable lens 43A and a fixed lens 43B corresponding to the movable lens 36A and the fixed lens 36B, respectively.

The relay lens 43 converts the blue light beam Lb2 from a parallel light beam into a converging light beam or a diverging light beam using a movable lens 43A. In addition, the relay lens 43 changes the converging state of the blue light beam Lb2 using a fixed lens 43B and causes the blue light beam Lb2 to be incident on an objective lens 45.

Furthermore, like the relay lens 36, under the control of the control unit 11 (see FIG. 4), the movable lens 43A of the relay lens 43 can be moved by an actuator (not shown). Thus, the converging state of the blue light beam Lb2 output from the fixed lens 43B can be changed.

The objective lens 45 has an optical characteristic similar to that of the objective lens 25. The objective lens 45 converts the blue light beam Lb2 into spherical waves by condensing the blue light beam Lb2 and emits the blue light beam Lb2 onto the second surface 100B of the optical disk 100.

At that time, as shown in FIG. 8, the blue light beam Lb2 is focused inside the recording layer 101. Here, a focal point Fb2 of the blue light beam Lb2 is determined by the converging state occurring when the blue light beam Lb2 is output from the fixed lens 43B of the relay lens 43. That is, like the focal point Fb1 of the blue light beam Lb1, the focal point Fb2 of the blue light beam Lb2 is moved in the recording layer 101 towards the first surface 100A or the second surface 100B in accordance with the position of the movable lens 43A.

In practice, in the initialization apparatus 10, by controlling the position of the movable lens 36A of the relay lens 36 and the position of the movable lens 43A of the relay lens 43 by the control unit 11 (see FIG. 4), a depth d2 of the focal point Fb2 (see FIG. 8) of the blue light beam Lb2 in the recording layer 101 of the optical disk 100 can be controlled.

At that time, in the initialization apparatus 10, under the control of the control unit 11, the focal point Fb2 of the blue light beam Lb2 when the objective lens 45 is located at the reference position is aligned with the focal point Fb1 of the blue light beam Lb1 when the objective lens 25 is located at the reference position and when it is assumed that surface deflection of the optical disk 100 does not occur, that is, the recording layer 101 is in an ideal state.

After being converged at the focal point Fb2, the blue light beam Lb2 further travels while being diverged. Hereinafter, this blue light beam Lb2 is referred to as a "transmitted blue light beam Lb3". The transmitted blue light beam Lb3 is made incident on the objective lens 25, and the diverging angle is adjusted. Thereafter, the transmitted blue light beam Lb3 travels via the beam splitter 24, the beam splitter 23, and the relay lens 36 so as to reversely travel along the optical path of the blue light beam Lb1. Thereafter, the transmitted blue light beam Lb3 is made incident on the beam splitter 35.

The beam splitter 35 reflects a predetermined percent of the transmitted blue light beam Lb3 and converges the transmitted blue light beam Lb3 using a condensing lens 46. The transmitted blue light beam Lb3 is made astigmatic by passing it through, for example, a cylindrical lens (not shown). Thereafter, the beam splitter 35 emits the transmitted blue light beam Lb3 onto a photodetector 47.

Like the photodetector 27, as shown in FIG. 7(B), the photodetector 47 includes four separate lattice-shaped detection areas 47A, 47B, 47C, and 47D in the surface thereof onto which the transmitted blue light beam Lb3 is emitted. Note that the direction indicated by an arrow a2 (the vertical direction in FIG. 7(B)) corresponds to a direction in which a track formed in the reference layer 102 moves.

The photodetector 47 detects portions of the transmitted blue light beam Lb3 using the detection areas 47A, 47B, 47C, and 47D. Thereafter, the photodetector 47 generates detection signals U2A, U2B, U2C, and U2D (hereinafter collectively referred to as "detection signals U2A to U2D") and outputs the detection signals to the drive control unit 12 (see FIG. 4).

Note that, in the initialization optical system 30, the optical positions of the optical components are adjusted so that the emission state of the transmitted blue light beam Lb3 when the transmitted blue light beam Lb3 is condensed by the condensing lens 46 and is emitted to the photodetector 47 reflects an amount of shift of the focal point Fb2 of the blue light beam Lb2 from the focal point Fb1 of the blue light beam Lb1 in the recording layer 101.

In order to perform focus control on the objective lens 45 using an astigmatism method, a servo control circuit 12B of the drive control unit 12 computes a focus error signal SFE2 using the detection signals U2A to U2D and the following equation (3):

$$SFE2 = (U2A + U2C) - (U2B + U2D) \qquad (3)$$

The focus error signal SFE2 represents an amount of shift of the focal point Fb1 of the blue light beam Lb1 from the focal point Fb2 of the blue light beam Lb2 in the focus direction.

Subsequently, the servo control circuit 12B generates a focus drive signal SFD2 by, for example, amplifying the focus error signal SFE2 and supplies the focus drive signal SFD2 to an actuator 48.

The actuator 48 is disposed between a lens holder (not shown) that supports the objective lens 45 and the optical pickup 16. The actuator 48 moves the objective lens 45 in the focus direction in accordance with the focus drive signal SFD2.

In this way, the optical pickup 16 performs focus control on the objective lens 45 so that the value of the focus error signal SFE2 is converged to a value "0", that is, the focal point Fb2 of the blue light beam Lb2 is aligned with the focal point Fb1 of the blue light beam Lb1 in the focus direction.

In addition, in order to perform tracking control on the objective lens 45 using a push-pull method, the servo control circuit 12B of the drive control unit 12 computes a tracking error signal STE2 using the detection signals U2A to U2D and the following equation (4):

$$STE2=(U2A+U2B)-(U2C+U2D) \quad (4)$$

The tracking error signal STE2 represents an amount of shift of the focal point Fb1 of the blue light beam Lb1 from the focal point Fb2 of the blue light beam Lb2 in the tracking direction.

Subsequently, the servo control circuit 12B generates a tracking drive signal STD2 by using the tracking error signal STE2 and supplies the tracking drive signal STD2 to the actuator 48. The actuator 48 moves the objective lens 45 in accordance with the tracking drive signal STD2.

In this way, the initialization apparatus 10 performs tracking control on the objective lens 45 so that the value of the tracking error signal STE2 is converged to a value "0", that is, the focal point Fb2 of the blue light beam Lb2 follows the focal point Fb1 of the blue light beam Lb1 in the tracking direction.

As described above, the initialization optical system 30 of the optical pickup 16 emits the blue light beam Lb1 and the blue light beam Lb2 onto the first surface 100A and the second surface 100B of the optical disk 100, respectively. In addition, the initialization optical system 30 performs focus control and tracking control on the objective lens 45. In this way, the initialization optical system 30 causes the focal point Fb2 of the blue light beam Lb2 to follow the focal point Fb1 of the blue light beam Lb1 so that the blue light beam Lb1 and the blue light beam Lb2 are focused onto the same focal point.

Note that the beam diameter of the blue light beam Lb1 is about 2 to about 4 mm immediately before the blue light beam Lb1 is made incident on the objective lens 25, while the beam diameter of the blue light beam Lb1 is 1 µm or less in the vicinity of the focal point Fb1. The same applies to the blue light beam Lb2.

That is, the initialization optical system 30 of the optical pickup 16 can increase the optical power density in the vicinity of the focal point Fb1 of the blue light beam Lb1 and the focal point Fb2 of the blue light beam Lb2 to about 4 million to 16 million times the original optical power density.

Accordingly, even when the initialization laser 31 (see FIG. 6) having an output power of about 100 [mW] is used for, for example, the optical disk 100 having a threshold value of sensitivity for light intensity, the initialization apparatus 10 can provide necessary and sufficient light intensity in the vicinity of the focal point Fb1 and the focal point Fb2. Consequently, the initialization apparatus 10 can form an appropriate hologram in the vicinity of the focal point Fb1 and the focal point Fb2.

(1-2-3) Formation of Initial Hologram

An initialization process of the optical disk 100 performed by the initialization apparatus 10 is described next. The initialization apparatus 10 initializes the optical disk 100 so that information can be recorded on the optical disk 100 using a negative recording method.

More specifically, the initialization apparatus 10 rotates the optical disk 100 at a constant linear speed and sequentially moves the optical pickup 16 from the inner periphery side to the outer periphery side. At the same time, the initialization apparatus 10 emits, into the recording layer 101, the blue light beams Lb1 and Lb2 each having a predetermined light intensity.

At that time, the initialization apparatus 10 stabilizes the relay lenses 36 and 43. Thus, the initialization apparatus 10 maintains the focal point Fb1 of the blue light beam Lb1 and the focal point Fb2 of the blue light beam Lb2 at the predetermined depths d1 and d2 in the reference layer 102, respectively.

Figure 9:
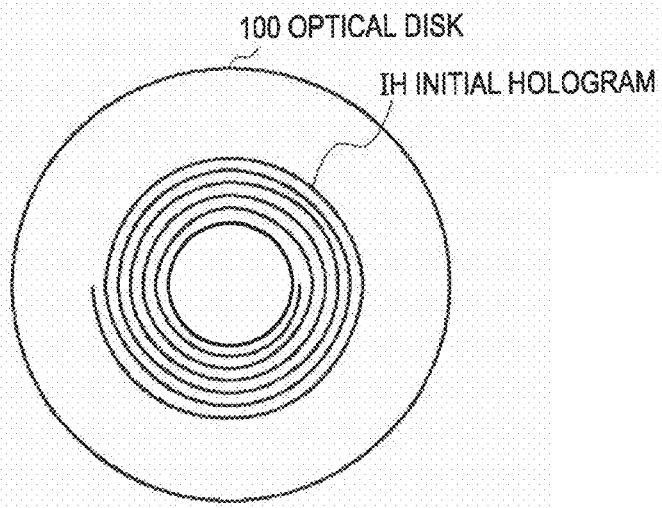
FIG. 9 is a schematic top view illustrating the formation of the initial hologram according to a first embodiment.

In this way, as shown in FIGS. 8 and 9, the initialization apparatus 10 forms a continuous linear hologram (hereinafter referred to as an "initial hologram IH") in a spiral pattern so that the hologram corresponds to the track formed in the reference layer 102, that is, the initialization apparatus 10 forms the hologram at a location at which information is to be recorded later. From another standpoint, the relative positions of the focal points Fb1 and Fb2 are moved in the recording layer 101 of the optical disk 100 in a spiral pattern with the focal point Fb1 aligned with the focal point Fb2.

More specifically, the initial hologram IH has a shape corresponding to a trajectory formed when an ellipsoidal hologram as shown in FIG. 3 circles in the recording layer 101 in a spiral pattern. The initial hologram IH has a width substantially the same as the diameter of the recording beam. In addition, the initial hologram IH has a length in the depth direction substantially the same as the focus depth of the objective lens. However, when looked at from above, the initial hologram IH can be visually recognized as a single line, as shown in FIG. 9.

In this case, the initial hologram IH is formed in only a portion of the recording layer 101 of the optical disk 100 at which information is to be recorded (i.e., a track). A portion where information should not be recorded, that is, a portion other than the portion corresponding to the track is not initialized at all.

As a result, in the optical disk 100, the portion in which the initial hologram IH is not to be formed continues to have low reflectivity to a light beam using the characteristic of a material of the recording layer 101. However, the portion in which an initial hologram is formed has high reflectivity to a light beam due to the characteristic of a hologram.

At that time, the initialization apparatus 10 stabilizes the relay lens 36 and 43. Thus, the initialization apparatus 10 maintains the depth d1 of the focal point Fb1 and the depth d2 of the focal point Fb2 unchanged in the recording layer 101 and forms the initial hologram IH in the recording layer 101. In this way, the whole initial hologram IH can be formed in an ideal plane so as to have a thin disk shape. Hereinafter, the layer formed by the initial hologram IH is referred to as an "initial hologram layer YH".

In other words, the initialization apparatus 10 sequentially moves the relative positions of the focal points Fb1 and Fb2 in the recording layer 101 of the optical disk 100 in an ideal plane that is substantially parallel to the reference layer 102, the first surface 100A, and the second surface 100B.

Figure 10:
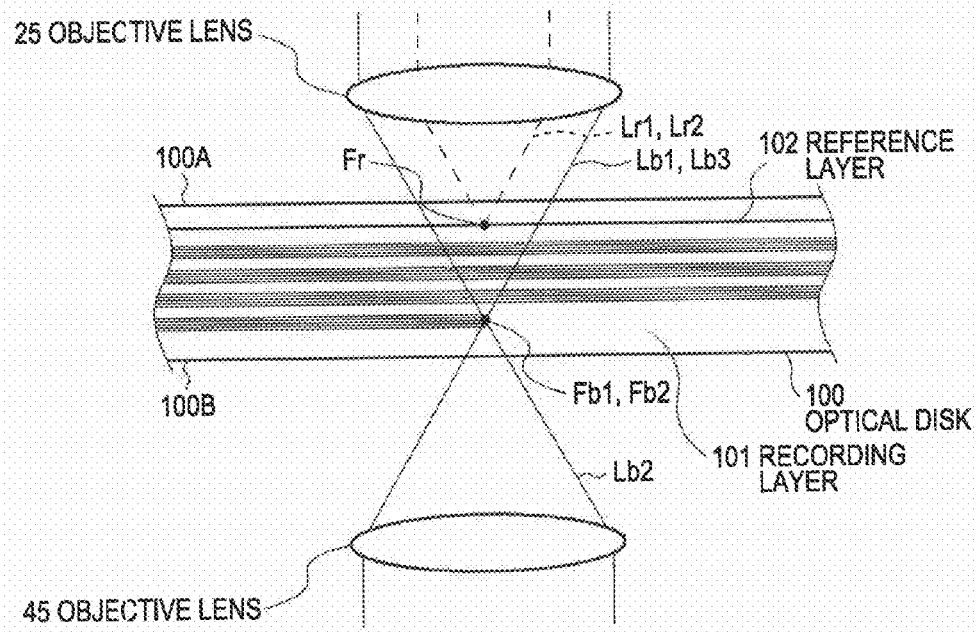
FIG. 10 is a schematic cross-sectional view illustrating the formation of the initial hologram according to a first embodiment.

In addition, the initialization apparatus 10 controls the relay lenses 36 and 43 so as to vary the depth d1 of the focal point Fb1 of the blue light beam Lb1 and the depth d2 of the focal point Fb2 of the blue light beam Lb2 in a stepwise manner. Accordingly, as shown in FIG. 10, a plurality of the initial hologram layers YH (e.g., 20 layers) can be formed.

In this way, a plurality of the initial hologram layers YH are formed in the recording layer 101 of the optical disk 100 so that the spirals of the initial hologram layers YH are aligned in the depth direction.

Here, the recording layer 101 is formed so as to have a relatively low reflectivity to a light beam using the characteristic of a material of the recording layer 101. However, the portion in which the initial hologram IH is formed has a relatively high reflectivity due to a characteristic of a hologram.

As described above, the initialization apparatus 10 initializes the optical disk 100 by forming, in the recording layer 101 of the optical disk 100, a linear initial hologram IH corresponding to the track of the reference layer 102.

(1-3) Recording and Reconstruction of Information on and from Optical Disk

Recording of information in the optical disk 100 initialized by the initialization apparatus 10 and reconstruction of information recorded in the optical disk 100 are described next.
(1-3-1) Architecture of Recording and Reconstruction Apparatus A recording and reconstruction apparatus 60 that records information in the optical disk 100 and reconstruct information recorded in the optical disk 100 is described first. The recording and reconstruction apparatus 60 is designed to record information in the initialized optical disk 100 and reconstruct information recorded in the optical disk 100 by a user, for example, at home.

Figure 11:
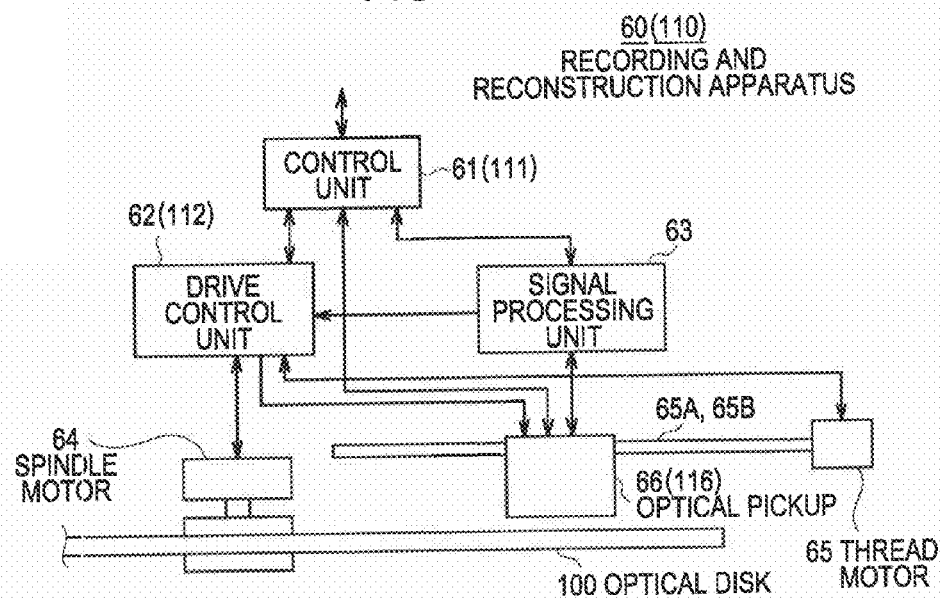
FIG. 11 is a schematic illustration of the structure of a recording and reconstruction apparatus.

As shown in FIG. 11, the recording and reconstruction apparatus 60 has a configuration similar to that of the initialization apparatus 10 (see FIG. 4). A control unit 61 performs overall control of the recording and reconstruction apparatus 60.

The control unit 61 is primarily formed from a central processing unit (CPU) (not shown). The control unit 61 reads a variety of programs, such as a basic program, an information recording program, and an information reconstructing program, from a read only memory (ROM) (not shown) and loads the programs into a random access memory (RAM) (not shown). In this way, the control unit 61 performs various processing, such as an information recording process and an information reconstructing process.

For example, when the control unit 61 receives, from an external apparatus (not shown), an information recording command, information to be recorded, and the address at which the information is to be recorded with the optical disk 100 mounted therein, the control unit 61 supplies a drive command to a drive control unit 62 under the control of, for example, the information recording program.

The drive control unit 62 is designed so as to perform computation on a supplied signal and generate a supply signal to be supplied to an actuator (described below). In addition, the drive control unit 62 is designed so as to perform a variety of drive control processes.

In response to the drive command, the drive control unit 62 controls driving of a spindle motor 64 so as to rotate the optical disk 100, for example, at a constant linear velocity. In addition, in response to the drive command, the drive control unit 62 controls driving of a thread motor 65 so as to move an optical pickup 66 in the radial direction of the optical disk 100 (i.e., the inner peripheral direction or the outer peripheral direction) along movement shafts 65A and 65B.

The optical pickup 66 emits a light beam from the side of the first surface 100A of the optical disk 100. In addition, the optical pickup 66 detects a light beam reflected by the optical disk 100 and supplies the detection result to the drive control unit 62 and a signal processing unit 63.

At that time, the intensity of the reflected light beam is maximized when the light beam is focused on the initial hologram IH. Accordingly, as in the case of widely used optical disks, the optical pickup 66 performs position control, such as focus control and tracking control, under the control of the drive control unit 62. Thereafter, the optical pickup 66 focuses the light beam at a desired location and record information (described in more detail below).

In addition, when the control unit 61 receives an information reconstruction command and the address from which information is reconstructed with the optical disk 100 mounted therein, the control unit 61 supplies a drive command to the drive control unit 62 under the control of the information reconstructing program.

At that time, the optical pickup 66 performs position control, such as focus control and tracking control, under the control of the drive control unit 62. Thereafter, the optical pickup 66 focuses the light beam at a desired location. The optical pickup 66 then detects a reflected light beam generated when the light beam is reflected by the optical disk 100.

The signal processing unit 63 performs, for example, a decoding process on a detection signal obtained using the reflected light beam and reconstructs information. Thereafter, the signal processing unit 63 supplies the reconstructed information to the control unit 61 (described in more detail below).

Figure 12:
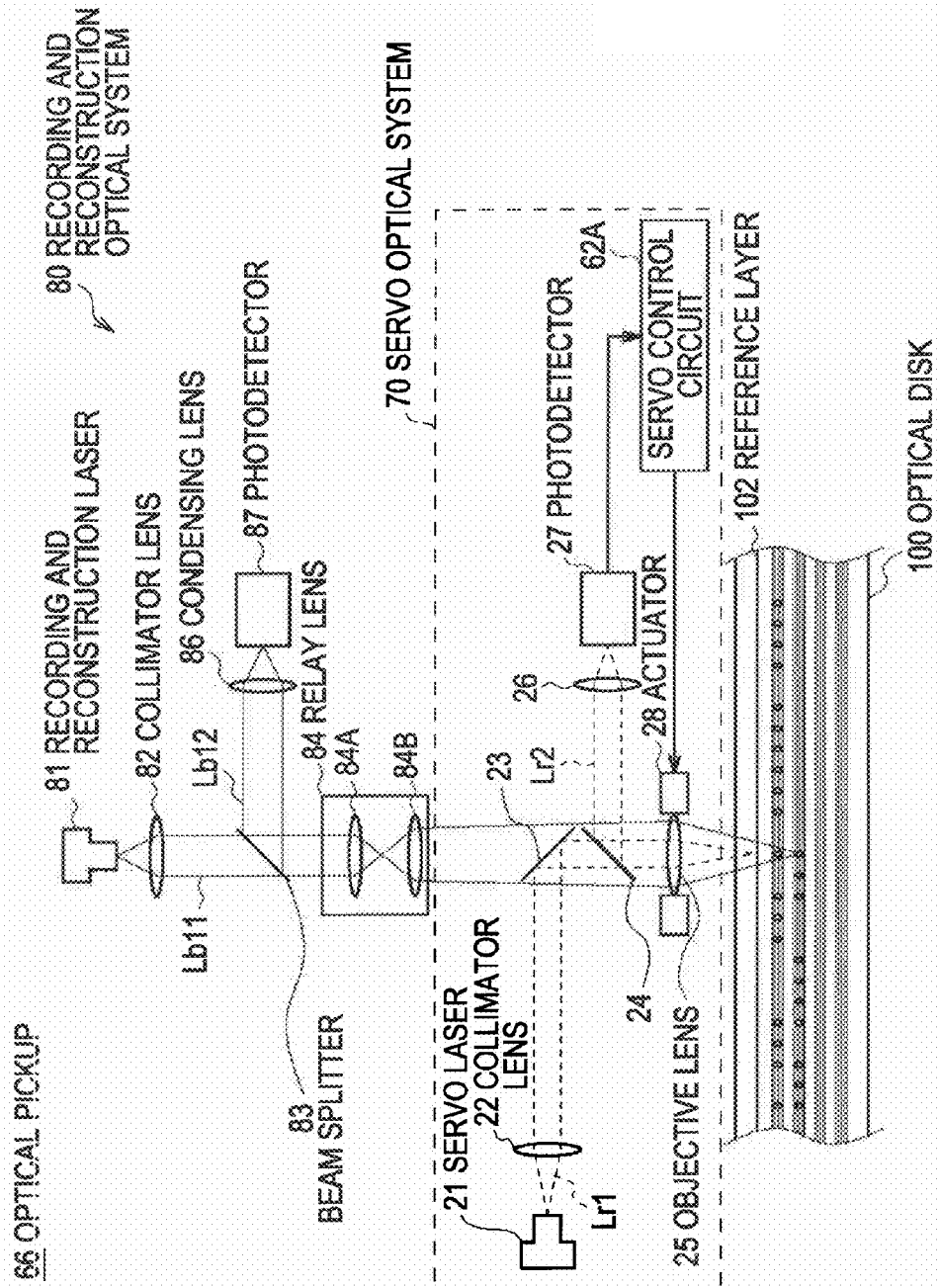
FIG. 12 is a schematic illustration of the structure of an optical pickup of the recording and reconstruction apparatus according to the first embodiment.

In this way, while performing position control, such as focus control and tracking control, the recording and reconstruction apparatus 60 records information in the initialized optical disk 100. In addition, while performing position control, the recording and reconstruction apparatus 60 reconstructs information recorded in the optical disk 100.
(1-3-2) Configuration of Optical Pickup of Recording and Reconstruction Apparatus The configuration of the optical pickup 66 is described next. As schematically illustrated in FIG. 12, the optical pickup 66 includes a plurality of optical components. The optical pickup 66 primarily includes a servo optical system 70 and a recording and reconstruction optical system 80.

The servo optical system 70 has a configuration similar to that of the servo optical system 20 (see FIG. 6) of the initialization apparatus 10 except that the servo optical system 70 includes a servo control circuit 62A in place of the servo control circuit 12A.

Like the servo control circuit 12A, the servo control circuit 62A performs focus control and tracking control. In addition, the servo control circuit 62A computes a reconstruction RF signal SRF1 using the detection signals U1A to U1D and the following equation (5): The servo control circuit 62A computes a value "1".

$$SRF1 = U1A + U1B + U1C + U1D \tag{5}$$

The reconstruction RF signal SRF1 includes address information regarding a track onto which the red light beam Lr1 is emitted. The address information is read from the reference layer 102 of the optical disk 100.

Subsequently, the servo control circuit 62A performs a predetermined decoding process on the reconstruction RF signal SRF1 and reconstructs the address information. The servo control circuit 62A then performs track-based position control of the thread motor 65 (see FIG. 11) and the actuator 28 using the reconstructed address information so that the red light beam Lr1 is emitted to the desired address.

That is, the servo optical system 70 performs focus control and tracking control of the objective lens 25 using the reference layer 102 of the optical disk 100 so that the red light beam Lr1 is focused on a track corresponding to the address at which information is recorded or from which information is reconstructed.

In contrast, unlike the initialization optical system 30 of the initialization apparatus 10, the recording and reconstruction optical system 80 is designed so as to emit a blue light beam onto only the first surface 100A of the optical disk 100.

For example, a recording and reconstruction laser 81 of the recording and reconstruction optical system 80 is a semiconductor laser. The initialization laser 81 can emit a blue laser beam having a wavelength of about 405 [nm]. When recording information in the optical disk 100, the recording and reconstruction laser 81 emits, under the control of the control unit 61 (see FIG. 11), a blue light beam Lb11 that is a diverging light beam and that has a relatively high intensity and causes the blue light beam Lb11 to be incident on a collimator lens 82.

The collimator lens 82 converts the blue light beam Lb11 from a diverging light beam into a parallel light beam and causes the blue light beam Lb11 to be incident on a beam splitter 83. The beam splitter 83 allows a predetermined percent of the blue light beam Lb11 to pass therethrough and causes the blue light beam Lb11 to be incident on a relay lens 84.

The relay lens 84 has a configuration similar to that of the relay lens 36 (see FIG. 6) of the initialization apparatus 10. The relay lens 84 converts the blue light beam Lb11 from a parallel light beam into a converging light beam or a diverging light beam using a movable lens 84A. In addition, the relay lens 84 changes the converging state of the blue light beam Lb11 using a fixed lens 84B and causes the blue light beam Lb11 to be incident on the beam splitter 23.

The beam splitter 23 allows the blue light beam Lb11 to pass therethrough in accordance with the wavelength of the blue light beam Lb11 and causes the blue light beam Lb11 to be incident on the beam splitter 24. The beam splitter 24 allows a predetermined percent of the blue light beam Lb11 to pass therethrough and causes the blue light beam Lb11 to be incident on the objective lens 25. The objective lens 25 condenses the blue light beam Lb11 and emits the blue light beam Lb11 onto the first surface 100A of the optical disk 100.

Here, a focal point Fb11 of the blue light beam Lb11 is determined by the converging state occurring when the blue light beam Lb11 is output from the fixed lens 84B of the relay lens 84. That is, under the control of the control unit 61, the focal point Fb11 of the blue light beam Lb11 is moved towards the first surface 100A or the second surface 100B in the recording layer 101 in accordance with the position of the movable lens 36A.

In practice, by controlling the position of the movable lens 84A, the control unit 61 aligns the focal point Fb11 of the blue light beam Lb11 with the initial hologram layer YH in which information is recorded (hereinafter referred to as a "target initial hologram layer YHG") among a plurality of the initial holograms layer YH formed in the recording layer 101 of the optical disk 100.

In this way, the focal point Fb11 of the blue light beam Lb11 is aligned with the linear initial hologram IH preformed at a location of the target initial hologram layer YHG in which information is to be recorded (hereinafter referred to as a "target location PG").

Figure 13:
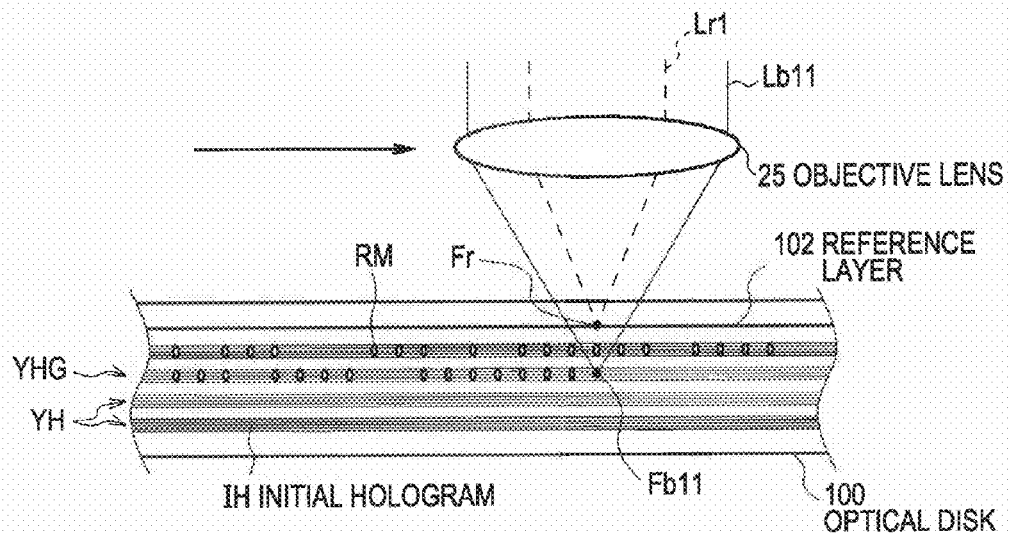
FIG. 13 is a schematic cross-sectional view illustrating recording of information according to the first embodiment.

At that time, the optical energy and the thermal energy of the blue light beam Lb11 is converged at the focal point Fb11 in the target initial hologram layer YHG of the recording layer 101. Accordingly, as shown in FIG. 13, a portion of the initial hologram IH in the vicinity of the target location PG is thermally or photochemically erased. Thus, a recording mark RM that has no holographic characteristics is locally formed.

In practice, the recording and reconstruction apparatus 60 performs a predetermined modulation process on the information to be recorded by using the signal processing unit 63 so as to convert the information into a binary value. Thereafter, when code "0" is received, the recording and reconstruction apparatus 60 stops emitting the blue light beam Lb11 and maintains the initial hologram IH. In contrast, when code "1" is received, the recording and reconstruction apparatus 60 emits the blue light beam Lb11 and erases the initial hologram IH so as to form the recording mark RM.

In addition, when the control unit 61 (see FIG. 11) reconstructs information recorded in the optical disk 100, the control unit 61 causes the recording and reconstruction laser 81 (see FIG. 12) to emit the blue light beam Lb11 having a relatively low intensity. In this way, the blue light beam Lb11 is emitted onto a desired track in the target initial hologram layer YHG (hereinafter referred to as a "target track").

At that time, if the portion of the initial hologram IH at the target location PG remains unerased, the blue light beam Lb11 is reflected by the initial hologram IH in the target track, and the blue light beam Lb11 becomes a reflected blue light beam Lb12.

The reflected blue light beam Lb12 travels along the optical path of the blue light beam Lb11 in a direction opposite to the direction in which the blue light beam Lb11 travels and is made incident on the beam splitter 83 via the objective lens 25, the beam splitter 24, the beam splitter 23, and the relay lens 84.

The beam splitter 83 reflects a portion of the reflected blue light beam Lb12 and causes the portion of the reflected blue light beam Lb12 to be incident on a condensing lens 86. The condensing lens 86 converges the reflected blue light beam Lb12 and emits the reflected blue light beam Lb12 onto a photodetector 87.

As shown in FIG. 7(C), the photodetector 87 detects the reflected blue light beam Lb12 using a single detection area 87A. Thereafter, the photodetector 87 generates a detection signal U3 in accordance with the detected intensity of the reflected blue light beam Lb12. Thereafter, the photodetector 87 transmits the detection signal U3 to the signal processing unit 63 (see FIG. 11).

At that time, if the signal processing unit 63 detects the reflected blue light beam Lb12, the signal processing unit 63 recognizes that the initial hologram IH remains unerased, that is, code "0" is recorded. However, if the signal processing unit 63 does not detect the reflected blue light beam Lb12, the signal processing unit 63 recognizes that the initial hologram IH is erased and that the recording mark RM is recorded, that is, code "1" is recorded.

The signal processing unit 63 reconstructs information recorded in the optical disk 100 by performing, for example, predetermined demodulation process and decoding process on the detection signal U3. Thereafter, the signal processing unit 63 supplies the reconstructed information to the control unit 61. Upon receiving the information, the control unit 61 outputs the reconstructed information to an external apparatus.

In this way, when recording information in the optical disk 100, the recording and reconstruction apparatus 60 erases the initial hologram IH or maintains the initial hologram IH unerased in accordance with the information to be recorded. When reconstructing information recorded in the optical disk 100, the recording and reconstruction apparatus 60 detects whether the initial hologram IH is erased or not in accordance with whether the blue light beam Lb11 is reflected or not. The recording and reconstruction apparatus 60 then reconstructs the information using the detection result.

(1-4) Operation and Advantages

By using the above-described configuration, the initialization apparatus 10 according to the first embodiment performs an initialization process. In the initialization process, the initialization apparatus 10 rotates the optical disk 100 and causes the red light beam Lr1 to follow a track formed in the reference layer 102 of the optical disk 100. By emitting the blue light beams Lb1 and Lb2 onto either side of the optical disk 100 so that the focal point Fb1 of the blue light beam Lb1 is aligned with the focal point Fb2 of the blue light beam Lb2, the initialization apparatus 10 forms the initial hologram IH in the recording layer 101.

In addition, the initialization apparatus 10 controls the relay lenses 36 and 43 using the control unit 11 so as to sequentially vary the distance between the reference layer 102 and the focal point Fb1 (and the focal point Fb2). Thus, the initialization apparatus 10 forms a plurality of the initial hologram layers YH.

Accordingly, even when the recording layer 101 of the optical disk 100 has a threshold value of sensitivity for light intensity and, therefore, the intensity of the light beam required for the initialization process is relatively high, the initialization apparatus 10 can provide light intensity necessary for the initialization process by condensing the blue light beams Lb1 and Lb2 in the form of spherical waves.

Furthermore, by sequentially moving the relative position of the focal point Fb1 and the focal point Fb2 in the optical disk 100, the initialization apparatus 10 can sequentially form the linear initial hologram IH in a spiral pattern in each of the initial hologram layers YH so that the initial hologram IH corresponds to each of the tracks in the reference layer 102.

That is, unlike existing initialization processes in which hologram layers are simultaneously formed by emitting plane waves to the whole optical disk 100, the initialization apparatus 10 can significantly reduce the optical energy or thermal energy to be emitted to the optical disk 100 at one time.

Accordingly, the initialization apparatus 10 can significantly reduce the output (i.e., the intensity) of the blue light beam Lb0 required for the initialization laser 31, as compared with the case in which plane waves are emitted to the whole optical disk 100. As a result, the structure of the optical pickup 16 or the configuration of the initialization apparatus 10 can be significantly simplified.

Note that, in practice, although a certain amount of time is required for the initialization process of the optical disk 100 performed by the initialization apparatus 10, the configuration of the initialization apparatus 10 is relatively simplified. Accordingly, for example, a large number of the initialization apparatuses 10 can be installed in a manufacturing plant of the optical disk 100. That is, in such a manufacturing plant, by using a large number of the initialization apparatuses 10 at the same time, the number of executed initialization processes of the optical disks 100 per unit time can be virtually increased. As a result, a sufficient number of the optical disks 100 can be produced.

In addition, since the initialization apparatus 10 causes the red light beam Lr1 to follow a track formed in the reference layer 102 and generates the initial hologram IH, the initial hologram IH can be sequentially formed in a portion in which information is to be recorded, that is, a portion corresponding to the track in the reference layer 102.

Accordingly, the initialization apparatus 10 can reliably form the initial hologram IH in a portion of the recording layer 101 in which information is to be recorded.

In addition, by controlling the relay lenses 36 and 43, the initialization apparatus 10 can form a plurality of the initial hologram layers YH corresponding to the same reference layer 102, the positions of the initial holograms IH can be aligned with one another in the depth direction of the optical disk 100.

In contrast, when recording information in the optical disk 100, the recording and reconstruction apparatus 60 causes the red light beam Lr1 to follow a reference target track formed in the reference layer 102 and emits the blue light beam Lb11 from the side of the first surface 100A of the optical disk 100 so that the blue light beam Lb11 is focused at the focal point Fb11 in the target initial hologram layer YHG. Thus, a portion of the initial hologram IH in the vicinity of the target location PG in the recording layer 101 is locally erased and, therefore, the recording mark RM is formed.

Furthermore, when reconstructing information from the optical disk 100, the recording and reconstruction apparatus 60 causes the red light beam Lr1 to follow the reference target track formed in the reference layer 102 and emits the blue light beam Lb11 from the side of the first surface 100A of the optical disk 100 so that the blue light beam Lb11 is focused on the target initial hologram layer YHG in the recording layer 101. Thereafter, the recording and reconstruction apparatus 60 detects the reflected blue light beam Lb12. Thus, the recording and reconstruction apparatus 60 reconstructs information in accordance with whether the initial hologram IH is present at the target location PG.

Accordingly, the recording and reconstruction apparatus 60 can record and reconstruct information using the optical pickup 66 having an optical system on only one side of the optical disk 100. That is, the structure of the recording and reconstruction apparatus 60 can be significantly simplified, as compared with that of the initialization apparatus 10.

According to the above-described configuration, the initialization apparatus 10 of the first embodiment rotates the optical disk 100, causes the red light beam Lr1 to follow a track formed in the reference layer 102, and emits the blue light beams Lb1 and Lb2 onto either side of the optical disk 100. Thus, the initialization apparatus 10 can perform an initialization process in which a linear initial hologram IH corresponding to a track in the reference layer 102 is formed in the recording layer 101 in a spiral pattern. Accordingly, the initialization apparatus 10 can form a planar initial hologram layer YH with significantly reduced optical energy or thermal energy emitted to the optical disk 100 at one time.

(2) Second Embodiment (2-1) Structure of Optical Disk

According to a second embodiment, like the first embodiment, an optical disk 100 (see FIG. 2) has a recording layer 101 and a reference layer 102. Therefore, the description of the optical disk 100 is not repeated.

(2-2) Configuration of Initialization Apparatus

However, according to the second embodiment, although an initialization apparatus 10 having a configuration similar to the first embodiment (see FIGS. 4 to 6) initializes the optical disk 100, the shape of an initial hologram IH formed in the recording layer 101 is different from that of the first embodiment (see FIG. 8).

Figure 14:
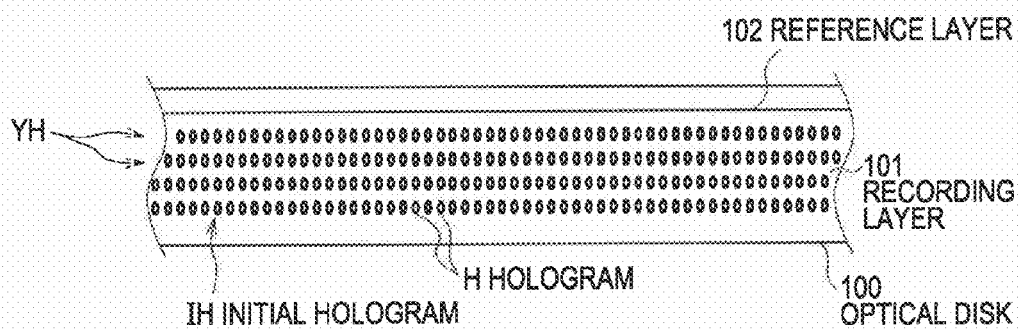
FIG. 14 is a schematic cross-sectional view illustrating the formation of an initial hologram according to a second embodiment.

That is, according to the second embodiment, as shown in FIG. 14 which corresponds to FIG. 8, the initialization apparatus 10 forms an initial hologram IH including a plurality of tiny ellipsoidal holograms H (see FIG. 3) by appropriately modulating the blue light beam Lb0 emitted from the initialization laser 31 under the control of the control unit 11.

Figure 15:
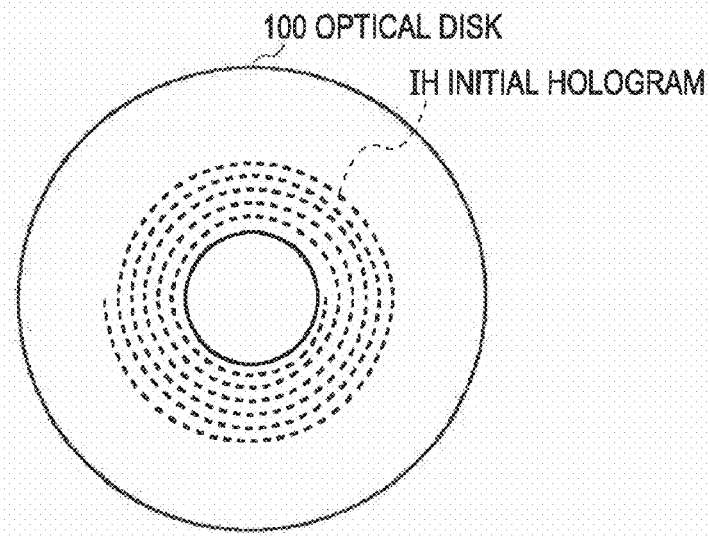
FIG. 15 is a schematic top view illustrating the formation of the initial hologram according to the second embodiment.

As shown in FIG. 15 which corresponds to FIG. 9, the initial hologram IH is arranged in a spiral pattern so as to correspond to a track formed in the reference layer 102. The whole initial hologram IH has a planar shape.

In addition, the initialization apparatus 10 forms one of the holograms H or no hologram H in a portion corresponding to the address information embedded in the track of the reference layer 102 in accordance with the address information.

In this way, the initialization apparatus 10 can form the initial hologram IH with the address information being represented as code in accordance with whether the hologram H is present or not.

Furthermore, like the first embodiment, the initialization apparatus 10 alters the depth d1 of the focal point Fb1 of the blue light beam Lb1 and the depth d2 of the focal point Fb2 of the blue light beam Lb2 in a stepwise manner by controlling the relay lenses 36 and 43. Thus, as shown in FIG. 14, a plurality of the initial hologram layers YH (e.g., 20 layers) can be formed.

Accordingly, a plurality of the initial hologram layers YH are formed in the recording layer 101 of the optical disk 100 so that the holograms H are stacked in the depth direction with the holograms H aligned with one another.

As described above, according to the second embodiment, the initialization apparatus 10 forms the initial hologram layer YH in the recording layer 101 of the optical disk 100 by arranging the initial hologram IH including a plurality of tiny ellipsoidal holograms H in a spiral pattern.

(2-3) Configuration of Recording and Reconstructing Apparatus

According to the second embodiment, a recording and reconstruction apparatus 110 corresponding to the recording and reconstruction apparatus 60 of the first embodiment (see FIG. 11) records information in the initialized optical disk 100 and reconstructs information recorded in the optical disk 100.

The recording and reconstruction apparatus 110 includes a control unit 111, a drive control unit 112, and an optical pickup 116, which correspond to the control unit 61, the drive control unit 62, and the optical pickup 66, respectively.

Figure 16:
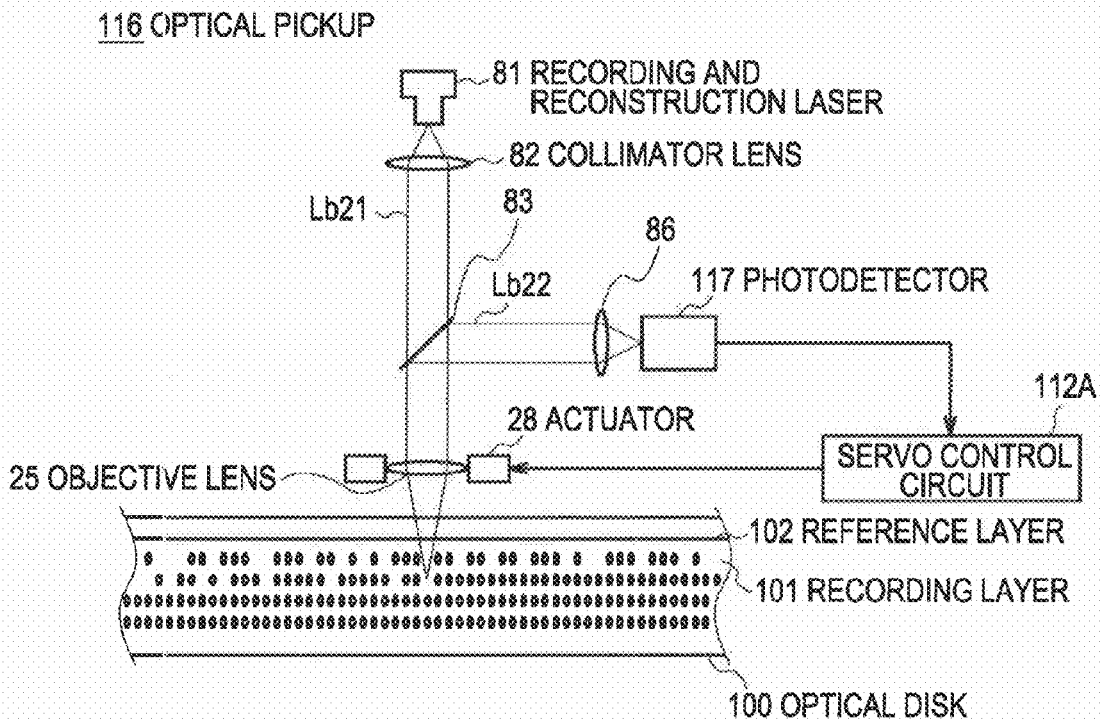
FIG. 16 is a schematic illustration of the structure of an optical pickup of a recording and reconstruction apparatus according to the second embodiment.

As shown in FIG. 16, in which the same numbering is used for components as was utilized in FIG. 12, the optical pickup 116 has a configuration in which the servo optical system 20 is removed from the optical pickup 66, the objective lens 25 and the actuator 28 still remain, and a servo control circuit 112A corresponding to the servo control circuit 62A is provided.

That is, in order to record information in the optical disk 100, the recording and reconstruction laser 81 of the optical pickup 116 emits a diverging blue light beam Lb21 having a relatively high intensity under the control of the control unit 111 (see FIG. 11) and causes the blue light beam Lb21 to be incident on the collimator lens 82.

The collimator lens 82 converts the blue light beam Lb21 from a diverging light beam to a parallel light beam and allows the blue light beam Lb21 to be incident on the beam splitter 83. The beam splitter 83 allows a predetermined percent of the blue light beam Lb21 to pass therethrough and allows the blue light beam Lb21 to be incident on the objective lens 25.

The objective lens 25 condenses the blue light beam Lb21 and allows the blue light beam Lb21 to be incident on the first surface 100A of the optical disk 100. At that time, the blue light beam Lb21 is reflected by the hologram H in the recording layer 101 and becomes a reflected blue light beam Lb22.

The reflected blue light beam Lb22 is converted into a parallel light beam by the objective lens 25 and is made incident on the beam splitter 83. The beam splitter 83 reflects a predetermined percent of the reflected blue light beam Lb22 and allows the reflected blue light beam Lb22 to be incident on the condensing lens 86.

The beam splitter 83 reflects a portion of the reflected blue light beam Lb22 and allows the portion of the reflected blue light beam Lb22 to be incident on the condensing lens 86. The condensing lens 86 converges the reflected blue light beam Lb12 and allows the reflected blue light beam Lb12 to be incident on a photodetector 117.

As shown in FIG. 7(D), the photodetector 117 includes four separate lattice-shaped detection areas 117A, 117B, 117C, and 117D in the surface thereof onto which the reflected blue light beam Lb22 is emitted. Note that the direction indicated by an arrow a3 (the vertical direction in FIG. 7(D)) corresponds to a direction in which a track formed by the holograms H arranged as the initial hologram IH moves.

The photodetector 117 detects portions of the reflected blue light beam Lb22 using the detection areas 117A, 117B, 117C, and 117D. Thereafter, the photodetector 117 generates detection signals U4A, U4B, U4C, and U4D (hereinafter collectively referred to as "detection signals U4A to U4D") and outputs the detection signals to the drive control unit 112 (see FIG. 11).

Note that, in the optical pickup 116, the optical positions of the optical components are adjusted so that the focusing state of the reflected blue light beam Lb22 when the reflected blue light beam Lb22 is condensed by the condensing lens 86 and is emitted onto the photodetector 117 is determined by the shift amount of a focal point Fb21 of the blue light beam Lb21 from the target hologram H in the recording layer 101.

In order to perform focus control on the objective lens 25 using an astigmatism method, the servo control circuit 112A of the drive control unit 112 computes a focus error signal SFE4 using the detection signals U4A to U4D and the following equation (6):

$$SFE4=(U4A+U4C)-(U4B+U4D) \quad (6)$$

The focus error signal SFE4 represents an amount of shift of the focal point Fb21 from the hologram H formed as the initial hologram IH in a focus direction.

Subsequently, the servo control circuit 112A generates a focus drive signal SFD4 by, for example, amplifying the focus error signal SFE4 and supplies the focus drive signal SFD4 to an actuator 28.

The actuator 28 is disposed between a lens holder (not shown) that supports the objective lens 25 and the optical pickup 116. The actuator 28 moves the objective lens 25 in the focus direction in accordance with the focus drive signal SFD4.

In this way, the recording and reconstruction apparatus 110 performs focus control on the objective lens 25 so that the value of the focus error signal SFE4 is converged to a value "0", that is, the blue light beam Lb21 is focused on the hologram H of the initial hologram IH.

In addition, in order to perform tracking control on the objective lens 25 using a push-pull method, the servo control circuit 112A of the drive control unit 112 computes a tracking error signal STE4 using the detection signals U4A to U4D and the following equation (7):

$$STE4=(U4A+U4B)-(U4C+U4D) \quad (7)$$

The tracking error signal STE4 represents an amount of shift of the focal point Fb21 from the hologram H formed as the initial hologram IH in the tracking direction.

Subsequently, the servo control circuit 112A generates a tracking drive signal STD4 using the tracking error signal STE4 and supplies the tracking drive signal STD4 to the actuator 28. The actuator 28 moves the objective lens 25 in the tracking direction in accordance with the tracking drive signal STD4.

In this way, the recording and reconstruction apparatus 110 performs tracking control on the objective lens 25 so that the tracking error signal STE4 is converged to a value "0", that is, the blue light beam Lb21 follows the hologram H of the initial hologram IH.

Furthermore, the servo control circuit 112A computes a reconstruction RF signal SRF4 using the detection signals U4A to U4D and the following equation (8):

The servo control circuit 112A computes a value "1."

$$SRF4=U4A+U4B+U4C+U4D \quad (8)$$

The reconstruction RF signal SRF4 contains address information indicated by the initial hologram IH of the optical disk 100.

Subsequently, the servo control circuit 112A performs, for example, a predetermined modulation process on the reconstruction RF signal SRF4 so as to reconstruct the address information. Using this address information, the servo control circuit 112A performs track-based position control of the thread motor 65 (see FIG. 11) and the actuator 28 so that the blue light beam Lb21 is emitted to a desired address.

As described above, the recording and reconstruction apparatus 110 is configured so as to cause the focal point Fb21 of the blue light beam Lb21 to follow a desired initial hologram IH by emitting the blue light beam Lb21 from the side of the first surface 100A of the optical disk 100 and performing focus control and tracking control on the objective lens 25 using the detection result of the reflected blue light beam Lb22.

Figure 17:
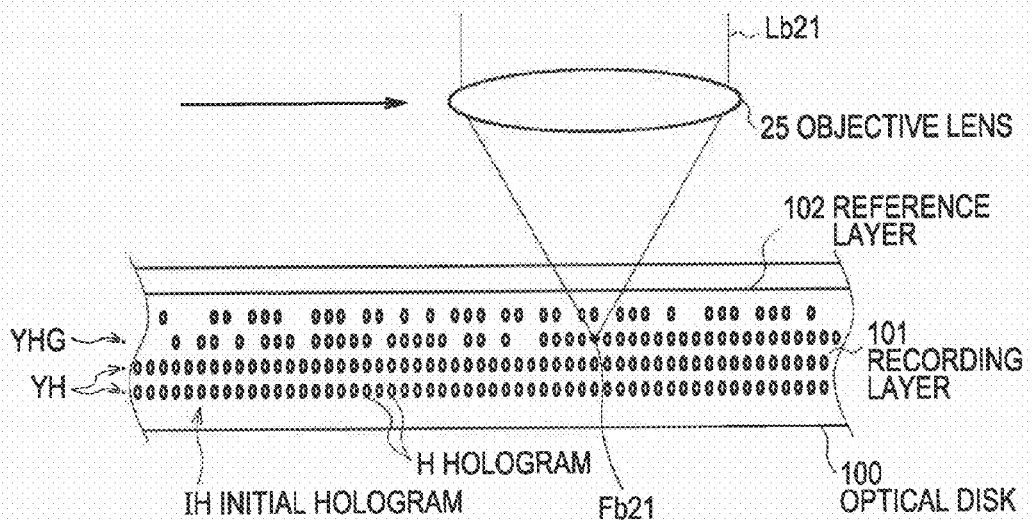
FIG. 17 is a schematic cross-sectional view illustrating recording of information according to the second embodiment.

As a result, as shown in FIG. 17, the blue light beam Lb21 positions the focal point Fb21 on a target track in the target initial hologram layer YHG, that is, on a tiny ellipsoidal hologram H preformed in the initial hologram IH.

At that time, since the optical energy and thermal energy of the blue light beam Lb21 are focused on the focal point Fb21 in the target initial hologram layer YHG of the recording layer 101, the hologram H of the initial hologram IH located at the target location PG is erased.

Thus, since the erased portion of the hologram H at the focal point Fb21 in the recording layer 101 loses the property of a hologram, the reflectivity to a light beam can be significantly decreased.

In practice, like the recording and reconstruction apparatus 60, the recording and reconstruction apparatus 110 performs, for example, a predetermined modulation process on information to be recorded using the signal processing unit 63 and converts the information into a binary value. Thereafter, for example, when code "0" is received, the recording and reconstruction apparatus 110 stops emitting the blue light beam Lb21 and maintains the initial hologram IH. In contrast, when code "1" is received, the recording and reconstruction apparatus 110 emits the blue light beam Lb21 and erases the initial hologram IH.

In addition, when information is reconstructed from the optical disk 100, the control unit 111 causes the recording and reconstruction laser 81 to emit the blue light beam Lb21 having a relatively low intensity. In this way, the blue light beam Lb21 is emitted onto the target track in the target initial hologram layer YHG.

At that time, if the portion of the initial hologram IH at the target location PG remains unerased, the blue light beam Lb21 is reflected by the initial hologram IH in the target track, and the blue light beam Lb21 becomes the reflected blue light beam Lb22. The reflected blue light beam Lb22 is then emitted to the photodetector 117 via the objective lens 25, the beam splitter 83, and the condensing lens 86.

The signal processing unit 63 computes the reconstruction RF signal SRF4 using the detection signals U4A to U4D supplied from the photodetector 117 and the above-described equation (8).

At that time, if the signal processing unit 63 detects the reflected blue light beam Lb22 using the photodetector 117 and, therefore, the signal level of the reconstruction RF signal SRF4 is high, the signal processing unit 63 recognizes that the initial hologram IH remains unerased, that is, code "0" is recorded.

However, if the photodetector 117 of the signal processing unit 63 does not detect the reflected blue light beam Lb22 and, therefore, the signal level of the reconstruction RF signal SRF4 is low, the signal processing unit 63 recognizes that the initial hologram IH is erased, that is, code "1" is recorded.

The signal processing unit 63 reconstructs information recorded in the optical disk 100 by performing, for example, a predetermined demodulation process and a predetermined decoding process on the reconstruction RF signal SRF4. Thereafter, the signal processing unit 63 supplies the reconstructed information to the control unit 111. Upon receiving the information, the control unit 111 outputs the reconstructed information to an external apparatus.

In this way, when recording information in the optical disk 100, the recording and reconstruction apparatus 110 erases a hologram H of the initial hologram IH or maintains a hologram H of the initial hologram IH unerased in accordance with the information to be recorded while performing focus control and tracking control using the initial hologram IH and referring to the address information. When reconstructing information recorded in the optical disk 100, the recording and reconstruction apparatus 110 detects whether a hologram H of the initial hologram IH is erased or not in accordance with whether the blue light beam Lb21 is reflected or not. The recording and reconstruction apparatus 110 then reconstructs the information using the detection result.

(2-4) Operation and Advantages

By using the above-described configuration, the initialization apparatus 10 according to the second embodiment performs an initialization process. In the initialization process, the initialization apparatus 10 rotates the optical disk 100 and causes the red light beam Lr1 to follow a track formed in the reference layer 102 of the optical disk 100. By emitting the blue light beams Lb1 and Lb2 onto either side of the optical disk 100 so that the focal point Fb1 of the blue light beam Lb1 is aligned with the focal point Fb2 of the blue light beam Lb2, the initialization apparatus 10 forms the tiny ellipsoidal holograms H serving as the initial hologram IH in the recording layer 101 and arranged in a spiral pattern.

In addition, the initialization apparatus 10 controls the relay lenses 36 and 43 using the control unit 11 so as to sequentially vary the distance between the reference layer 102 and the focal point Fb1 (and the focal point Fb2). Thus, the initialization apparatus 10 forms a plurality of the initial hologram layers YH.

Accordingly, like the first embodiment, even when the recording layer 101 of the optical disk 100 has a threshold value of sensitivity for light intensity and, therefore, the intensity of the light beam required for the initialization process is relatively high, the initialization apparatus 10 can provide light intensity necessary for the initialization process by condensing the blue light beams Lb1 and Lb2 in the form of spherical waves.

Furthermore, by sequentially moving the relative position of the focal point Fb1 and the focal point Fb2 in the optical disk 100, the initialization apparatus 10 can sequentially form the initial hologram IH including tiny ellipsoidal holograms H arranged in a spiral pattern in each of the initial hologram layers YH so that the initial hologram IH corresponds to each of the tracks in the reference layer 102.

That is, like the first embodiment, in the second embodiment, unlike existing initialization processes in which hologram layers are simultaneously formed by emitting plane wave to the whole optical disk 100, the initialization apparatus 10 can significantly reduce the optical energy or thermal energy to be emitted to the optical disk 100 at a given time.

In addition, since the initialization apparatus 10 forms the initial hologram IH while causing the red light beam Lr1 to follow the track formed in the reference layer 102, the initialization apparatus 10 can sequentially form the holograms H of the initial hologram IH at locations at which information is to be recorded, that is, at locations corresponding to the track in the reference layer 102.

Accordingly, like the first embodiment, the initialization apparatus 10 can reliably form the initial hologram IH in the recording layer 101 at locations at which information is to be recorded.

Furthermore, the initialization apparatus 10 forms the initial hologram IH at a location corresponding to the address information indicated by the track in the reference layer 102 so that the address information is represented by the presence/absence of the hologram H.

Accordingly, when recording and reconstructing information in and from the optical disk 100, the recording and reconstruction apparatus 110 can perform focus control, tracking control, and address reference on the basis of the reflected blue light beam Lb22 that is generated when the blue light beam Lb21 is reflected by the initial hologram IH. Consequently, unlike the recording and reconstruction apparatus 60 (see FIG. 12), the need for the servo optical system 70 is eliminated in the recording and reconstruction apparatus 110. That is, the recording and reconstruction apparatus 110 can have a significantly simplified configuration.

Still furthermore, since the recording and reconstruction apparatus 110 performs focus control and tracking control using the initial hologram layer YH that actually records therein and reconstructs information therefrom, the accuracy of the focus control and tracking control can be increased, as compared with the recording and reconstruction apparatus 60 that performs focus control and tracking control using the reference layer 102 remote from the initial hologram layer YH.

According to the second embodiment, the other advantages that are the same as those of the first embodiment can be provided.

According to the above-described configuration, the initialization apparatus 10 according to the second embodiment rotates the optical disk 100, causes the red light beam Lr1 to follow a track formed in the reference layer 102, and emits the blue light beams Lb1 and Lb2 onto either side of the optical disk 100. Thus, the initialization apparatus 10 can perform an initialization process in which an initial hologram IH including tiny ellipsoidal holograms is formed in the recording layer 101 in a spiral pattern so as to correspond to the track in the reference layer 102. Accordingly, the initialization apparatus 10 can form a planar initial hologram layer YH with significantly reduced optical energy or thermal energy emitted to the optical disk 100 at one time.

(3) Other Embodiments

While the first embodiment has been described with reference to the initial hologram IH formed in the recording layer 101 of the optical disk 100 in a spiral pattern, the present invention is not limited thereto. For example, the initial hologram IH may be formed in a concentric circle pattern.

In addition, while the foregoing embodiments have been described with reference to the case in which the spiral initial hologram IH is formed by rotating the optical disk 100 using the spindle motor 14 and moving the optical pickup 16 in the radial direction of the optical disk 100 using the thread motor 15, the present invention is not limited thereto. For example, the optical pickup 16 may be stationary. By moving the spindle motor 14, the position to which the blue light beam Lb1 is emitted from the optical pickup 16 may be moved in the radial direction of the optical disk 100.

Furthermore, while the first embodiment has been described with reference to the initialization laser 31 emitting the blue light beam Lb0 having a constant intensity, the present invention is not limited thereto. For example, like a light strategy used for CD-Rs, the output intensity of the blue light beam Lb0 may be appropriately modulated.

Figure 18:
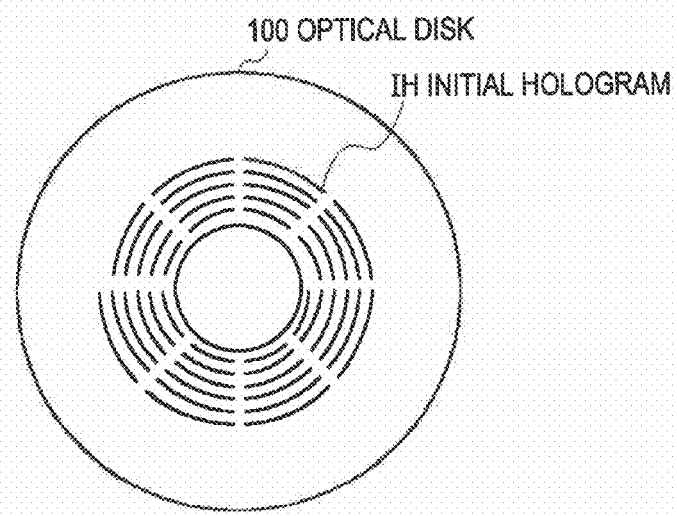
FIG. 18 is a schematic top view illustrating formation of an initial hologram according to another embodiment.

Furthermore, while the first embodiment has been described with reference to the linear initial hologram IH that is formed continuously, the present invention is not limited thereto. For example, as shown in FIG. 18 corresponding to FIG. 9, the initial hologram IH may be separately formed for each of the sectors.

Furthermore, like the second embodiment, in the first embodiment, the linear initial hologram IH need not be formed in a portion corresponding to a code value "1" of the address information. Instead, the initial hologram IH may be formed in a portion corresponding to a code value "0" and a portion in which information is to be recorded. Thus, the address information may be embedded in the initial hologram IH.

In this way, by using the recording and reconstruction apparatus 110 according to the second embodiment, focus control, tracking control, and address reference can be performed, and information can be recorded and reconstructed into and from the optical disk 100.

Furthermore, while the first and second embodiments have been described with reference to the recording and reconstruction apparatuses 60 and 110 that record information by thermally or photochemically erasing a portion of the initial hologram IH in the vicinity of the target location PG, the present invention is not limited thereto. For example, an air bubble may be formed in the portion of the initial hologram IH in the vicinity of the target location PG by converging heat at the portion so as to generate a cavity. That is, it is only necessary that the reflectivity to a light beam be sufficiently decreased, as compared with that of a hologram.

Furthermore, while the first and second embodiments have been described with reference to the linear initial hologram IH formed in a spiral pattern in a disk-shaped optical disk 100, the present invention is not limited thereto. For example, the planar initial hologram IH may be formed in a rectangular parallelepiped recording medium by two-dimensionally moving an optical pickup.

Furthermore, while the first embodiment has been described with reference to the focus control and tracking control of the objective lens 25 using the reflected red light beam Lr2 generated when the red light beam Lr1 is reflected by the reference layer 102 in the recording and reconstruction apparatus 60, the present invention is not limited thereto. For example, like the second embodiment, at least one of focus control and tracking control may be performed using a detection result of the reflected blue light beam Lb12 generated when the blue light beam Lb11 is reflected by the initial hologram IH. In such a case, the address information indicated by the reference layer 102 may be further referred to using a detection result of the reflected red light beam Lr2.

Furthermore, while the first embodiment has been described with reference to the track of the reference layer 102 including address information, the present invention is not limited thereto. For example, the address information is removed from the track of the reference layer 102.

Furthermore, while the first and second embodiments have been described with reference to the case in which the initial hologram IH is formed by controlling the rotation of the optical disk 100 using the spindle motor 14 so that the linear velocity of the optical disk 100 is constant, the present invention is not limited thereto. For example, the optical disk 100 may be rotated at a constant angular velocity by the spindle motor 14. The optical pickup 16 may be controlled so as to be moved in synchronization with the angular velocity, and the intensities of the blue light beams Lb1 and Lb2 may be changed in accordance with the linear velocity of the optical disk 100 at that point of time. In this way, the initial hologram IH having a constant cross section may be formed.

Furthermore, while the first and second embodiments have been described with reference to the case in which the initial hologram IH is formed by emitting the red light beam Lr1 to the reference layer 102 and performing focus control and tracking control on the objective lens 25, the present invention is not limited thereto. For example, by controlling the rotation speed of the spindle motor 14 and the moving speed of the optical pickup 16 moved by the thread motor 15, the initial hologram IH may be formed without performing the focus control and tracking control on the objective lens 25. In such a case, the reference layer 102 may be removed from the optical disk 100.

Furthermore, while, like the first embodiment, the second embodiment has been described with reference to the optical disk 100 including the reference layer 102, the present invention is not limited thereto. For example, the reference layer 102 may be removed from the optical disk 100. Only when the optical disk 100 is initialized, a reference disk including the reference layer 102 may be temporarily mounted on the optical disk 100 and, subsequently, the initialization process may be performed.

Furthermore, while the foregoing embodiments have been described with reference to the objective lenses 25 and 45 having a numerical aperture of 0.5, the present invention is not limited thereto. For example, the objective lenses 25 and 45 may have the value of a numerical aperture other than 0.5. In this case, in order to reduce the diameter of the blue light beam Lb1 in the vicinity of the focal point Fb1, it is desirable that the numerical aperture be large. However, in order to prevent the effect of spherical aberration caused by the optical disk 100, it is desirable that the numerical aperture be small. Accordingly, in order to achieve a balance, it is desirable that the numerical aperture be in the range of about 0.5 to about 0.85. In addition, the numerical aperture of the objective lens 25 of the initialization apparatus 10 may differ from that of the recording and reconstruction apparatus 60 or the recording and reconstruction apparatus 110.

Furthermore, while the foregoing embodiments have been described with reference to focus control using an astigmatism method and tracking control using a push-pull method, the present invention is not limited thereto. For example, a variety of focus control methods and tracking control methods may be employed (e.g., focus control may be performed using a three-beam method, and tracking control may be performed using a three-spot method or a DPD (Differential Phase Detect) method). In addition, different methods may be applied to the servo optical systems 20 and 70, and the initialization optical system 30 and the recording and reconstruction optical system 80.

Furthermore, while the first and second embodiments have been described with reference to the reference layer 102 formed on the side of the first surface 100A, the present invention is not limited thereto. For example, the reference layer 102 may be formed in the middle of the recording layer 101. Alternatively, the reference layer 102 may be formed on the side of the second surface 100B.

Furthermore, while the first and second embodiments have been described with reference to the blue light beam having a wavelength of about 405 [nm] and serving as a light beam for forming the initial hologram IH (referred to as an "initialization light beam") and a light beam for recording and reconstructing information (referred to as an "information light beam"), the present invention is not limited thereto. For example, the initialization light beam and the information light beam may have any different wavelengths. However, although the two light beams may have different wavelengths, it is desirable that the wavelengths of the two light beams be the same in consideration of the characteristics of the optical disk 100.

Furthermore, while the first and second embodiments have been described with reference to the red light beam (referred to as a "servo light beam") having a wavelength of about 650 [nm] and serving as a light beam for position control of the objective lens 25 in the initialization apparatus 10 of the first and second embodiments and the recording and reconstruction apparatus 60 of the second embodiment, the present invention is not limited thereto. A wavelength of any value may be used. In particular, since the wavelengths of the initialization light beam and the information light beam are set to about 405 [nm], it is desirable that the wavelength of the servo light beam be in the range of, for example, about 600 to about 700 [nm].

In this case, the reference layer 102 can have a characteristic so as to reflect almost all of the servo light beam and allows almost all of the initialization light beam and the information light beams to pass therethrough. In addition, the recording layer 101 can be formed of a material that is sensitive to the wavelengths of the initialization light beam and the information light beam.

Furthermore, while the foregoing embodiments have been described with reference to the optical disk 100 formed from the recording layer 101 and the reference layer 102, the present invention is not limited thereto. For example, in addition to the recording layer 101 and the reference layer 102, the structure may include substrates having a high light transmittance and covering either side of the recording layer 101. The substrates protect the recording layer 101.

Furthermore, while the first and second embodiments have been described with reference to the recording and reconstruction apparatuses 60 and 110 that record and reconstruct information into and from the optical disk 100, the present invention is not limited thereto. For example, a recording apparatus that only records information may record information in the optical disk 100, and a reconstruction apparatus that only reconstructs information may reconstruct information from the optical disk 100.

Furthermore, while the first and second embodiments have been described with reference to the initialization apparatus 10 serving as an information recording medium initialization apparatus and including the initialization optical system 30 serving as light emitting means, the spindle motor 14, the thread motor 15, the actuators 28 and 48, the relay lenses 36 and 43, and the drive control unit 12 serving as focal point moving means, the present invention is not limited thereto. For example, the information recording medium initialization apparatus may include light emitting means and focal point moving means formed from one of other various configurations.

Still furthermore, while the second embodiments have been described with reference to the recording and reconstruction apparatus 110 serving as an information recording apparatus and including the spindle motor 64, the thread motor 65, the actuator 28, and the drive control unit 112 serving as focal point moving means, and the recording and reconstruction laser 81, the collimator lens 82, and the objective lens 25 serving as light emitting means, the present invention is not limited thereto. For example, the information recording apparatus may include focal point moving means and light emitting means formed from one of other various configurations.

INDUSTRIAL APPLICABILITY

The present invention is applicable to an optical disk apparatus that records video data and audio data, or computer data in an optical disk and reconstructs the information recorded in the optical disk. In addition, the present invention is applicable to an initialization apparatus that initializes the optical disk.

The invention claimed is:

1. An information recording medium initialization apparatus for initializing an information recording medium having a recording layer and a reference layer that records information therein through erasing of a preformed initial hologram in the recording layer, comprising:
   a laser configured to emit an initialization laser beam;
   a beam splitter configured to split the initialization laser beam into two separate beams;
   mirrors configured to direct the two separate beams toward opposite sides of the information recording medium;
   first and second objective lenses configured to focus the two separate beams into two spherical wave recording beams propagating in opposite directions at the same focal point in the information recording medium, forming the initial hologram in the vicinity of the focal point;
   a focal point moving mechanism configured to sequentially move the focal point along a trajectory at which information is to be recorded later while continuously emitting the two recording beams to form a continuous linear initial hologram;
   a servo laser configured to emit a servo light beam through the first objective lens to a target track in the reference layer of the information recording medium;
   a first photodetector configured to convert a servo reflection light beam generated when the servo light beam is reflected by the reference layer into a first received servo light signal;
   a first servo control circuit configured to move the first objective lens towards or away from the optical information recording medium in response to the first received servo light signal;
   a second photodetector configured to convert a light beam transmitted through the information recording medium from the second objective lens into a second received servo light signal; and
   a second servo control circuit configured to move the second objective lens towards or away from the optical information recording medium in response to the second received servo light signal.

2. The information recording medium initialization apparatus according to claim 1, characterized in that the focal point moving mechanism is configured to change a position of the focal point in a virtual plane in the information recording medium.

3. The information recording medium initialization apparatus according to claim 2, characterized in that the focal point moving mechanism is configured to form the linear initial hologram along the trajectory of the focal point in the virtual plane by moving the focal point in the virtual plane with the two spherical wave recording beams focused at the same focal point.

4. The information recording medium initialization apparatus according to claim 2, characterized in that the focal point moving mechanism is configured to move the focal point in the virtual plane in a spiral pattern or in a concentric circle pattern.

5. The information recording medium initialization apparatus according to claim 2, characterized in that the focal point moving mechanism is configured to sequentially form a plurality of the initial holograms arranged along the trajectory of the focal point in the virtual plane by changing the position of the focal point in the virtual plane.

6. The information recording medium initialization apparatus according to claim 2, characterized in that the focal point moving mechanism is configured to form a plurality of layers of the initial hologram by sequentially changing a plurality of the virtual planes in the information recording medium.

7. A method for initializing an information recording medium having a recording layer and a reference layer that records information therein through erasing of a preformed initial hologram in the recording layer, comprising the steps of:
   providing an initialization laser beam;
   splitting the initialization laser beam into two separate beams;
   directing the two separate beams toward opposite sides of the information recording medium;
   focusing the two separate beams through first and second objective lenses into two spherical wave recording beams propagating in opposite directions at the same focal point in the information recording medium to form the initial hologram in the vicinity of the focal point; and
   sequentially moving the focal point along a trajectory at which information is to be recorded later while continuously emitting the two recording beams emitting a servo light beam through the first objective lens to a target track in the reference layer of the information recording medium;

receiving a servo reflection light beam generated when the servo light beam is reflected by the reference layer and converting it into a first received servo light signal;

performing first servo focus control by moving the first objective lens towards or away from the optical information recording medium in response to the first received servo light signal;

receiving a light beam transmitted through the information recording medium from the second objective lens and converting it into a second received servo light signal; and performing second servo focus control by moving the second objective lens towards or away from the optical information recording medium in response to the second received servo light.

8. An information recording medium produced by the method of claim 7, characterized in that it comprises a recording layer including an initial hologram continuously formed in a space having a substantially uniform index of refraction along a virtual trajectory.

9. An information recording medium according to claim 8, characterized in that the recording layer includes the initial hologram formed in a predetermined virtual plane.

10. An information recording medium according to claim 9, characterized in that the initial hologram is formed in the virtual plane in a spiral pattern or in a concentric circle pattern.

11. An information recording medium according to claim 9, characterized in that a plurality of layers of the initial hologram are stacked by forming the initial hologram in each of a plurality of the virtual planes that are parallel to one another.

* * * * *